United States Patent [19]

Lerdal et al.

[11] Patent Number: 5,805,377
[45] Date of Patent: Sep. 8, 1998

[54] WIRE CARRIER FOR DISK DRIVE

[75] Inventors: Michael J. Lerdal, Longmont; William J. Bryan, Boulder; Karl E. Hase, Lyons, all of Colo.

[73] Assignee: Seagate Technology, Inc., Scotts Valley, Calif.

[21] Appl. No.: 643,230

[22] Filed: May 2, 1996

Related U.S. Application Data

[63] Continuation of Ser. No. 150,858, Nov. 12, 1993, abandoned.

[51] Int. Cl.[6] ........................................... G11B 5/48
[52] U.S. Cl. ..................... 360/97.01; 360/104; 360/108
[58] Field of Search ................... 360/104, 105, 360/106, 107, 108, 109, 97.01, 98.01

[56] References Cited

U.S. PATENT DOCUMENTS

| | | | |
|---|---|---|---|
| 4,645,280 | 2/1987 | Gordon et al. | 339/17 F |
| 5,012,368 | 4/1991 | Bosier et al. | 360/104 |
| 5,074,029 | 12/1991 | Brooks, Jr. et al. | 29/603 |
| 5,103,359 | 4/1992 | Marazzo | 360/104 |
| 5,124,508 | 6/1992 | DuBrucq | 174/260 |
| 5,166,846 | 11/1992 | Shigemoto | 360/104 |
| 5,249,092 | 9/1993 | Russell-Smith et al. | 360/104 |
| 5,285,948 | 2/1994 | Rupp et al. | 228/104 |
| 5,419,033 | 5/1995 | Brooks, Jr. et al. | 29/603 |

FOREIGN PATENT DOCUMENTS

| | | |
|---|---|---|
| 0 555 969 A1 | 8/1993 | European Pat. Off. . |
| 4-69803 | 3/1992 | Japan ..................... 360/104 |

*Primary Examiner*—Stuart S. Levy
*Assistant Examiner*—William J. Klimowicz
*Attorney, Agent, or Firm*—Fliesler, Dubb, Meyer & Lovejoy LLP

[57] ABSTRACT

A member securing electrical conductors coupled to a read/write head in a storage device over termination pads of an electrical flex circuit. Generally, the storage device includes an actuator having at least one actuator arm securing the read/write head, and the apparatus is coupled to the actuator arm. The apparatus may comprise a member having a first end and a second end, the first end being coupled to the arm and the second end positioning the conductors over conductive pads of the flex circuit, with the second end including a window securing the conductors in fixed positions over the conductive pads of the flex circuit. In another arrangement, the second end comprises a solderless coupling assembly electrically connected to the conductors, wherein the conductive pads of the flex circuit are arranged to electrically couple to the solderless coupling assembly.

19 Claims, 34 Drawing Sheets

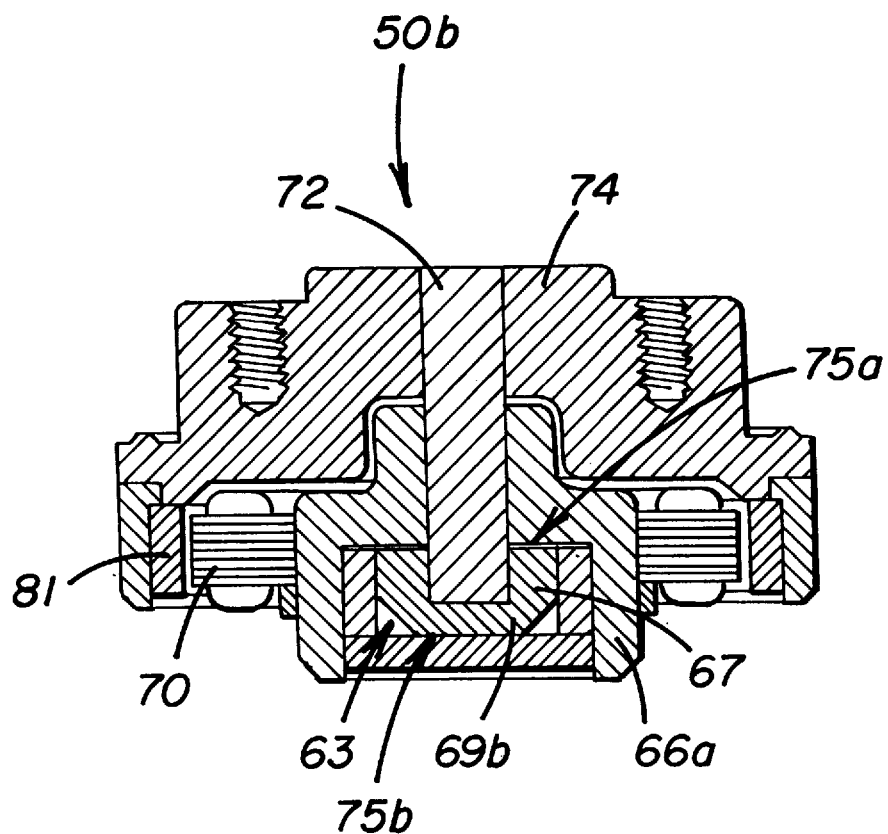
FIG. IE

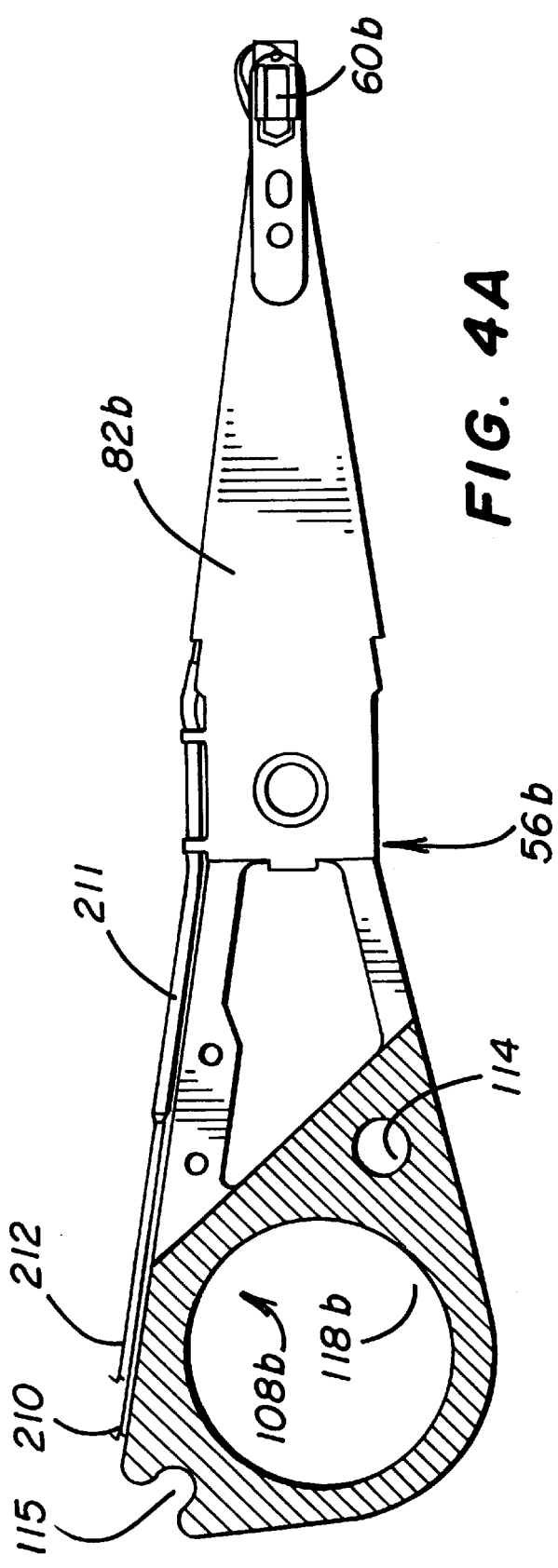
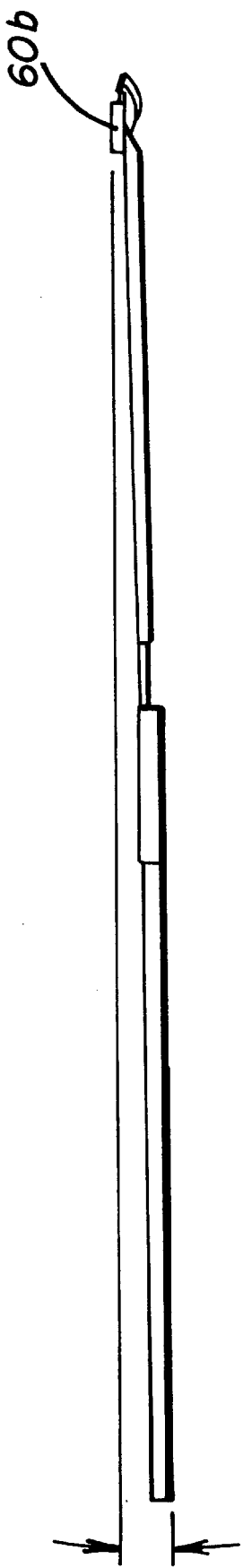
FIG. 4A
FIG. 4B

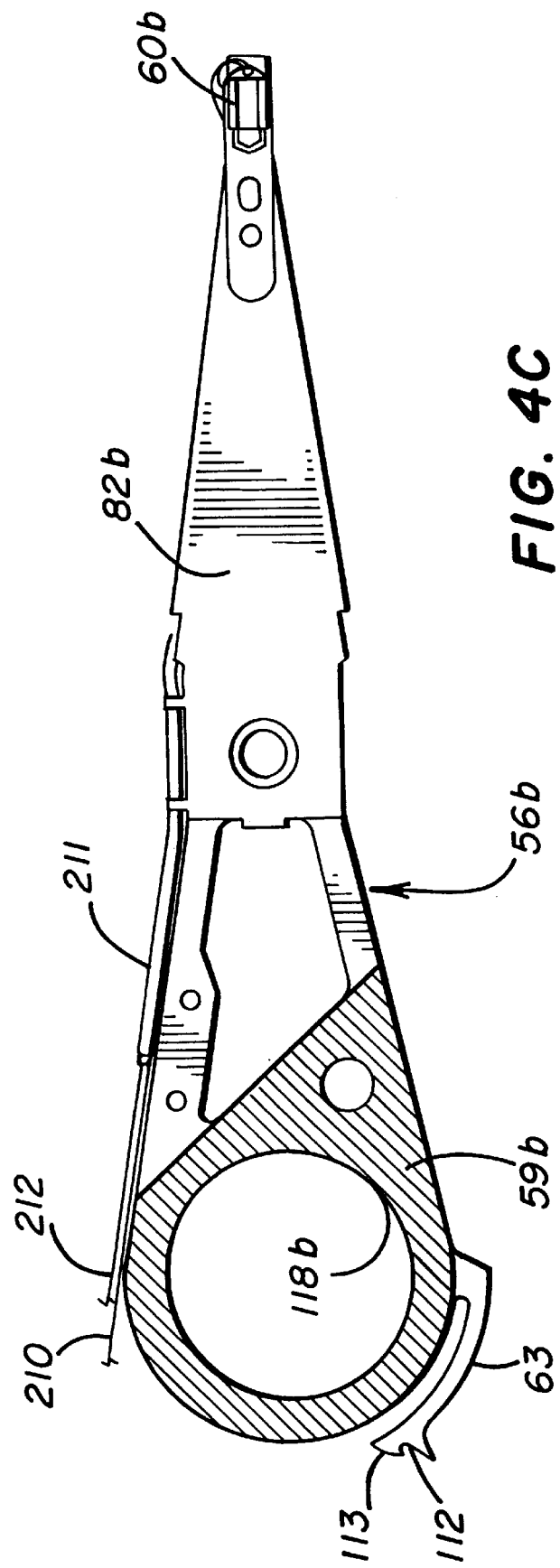

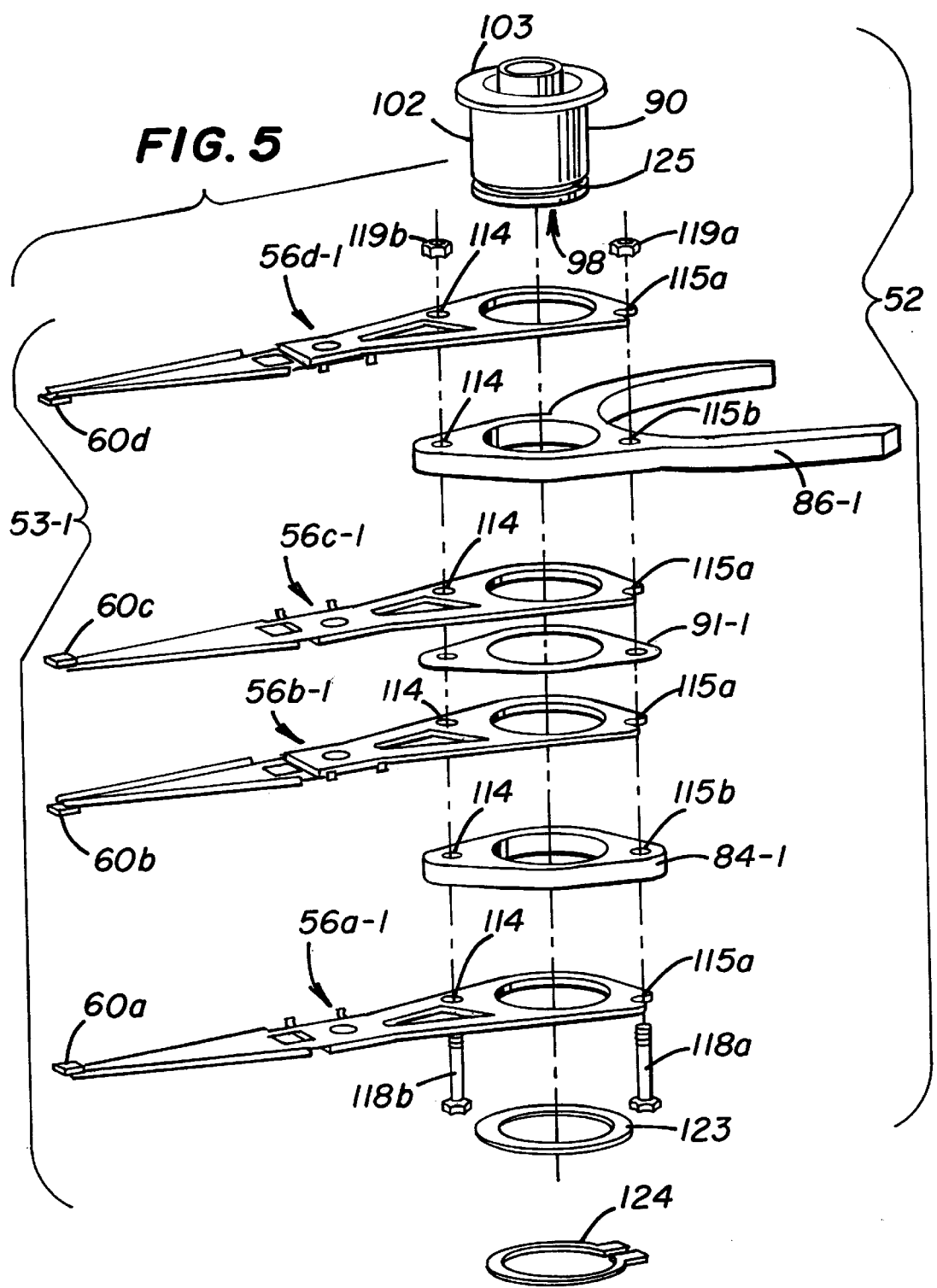

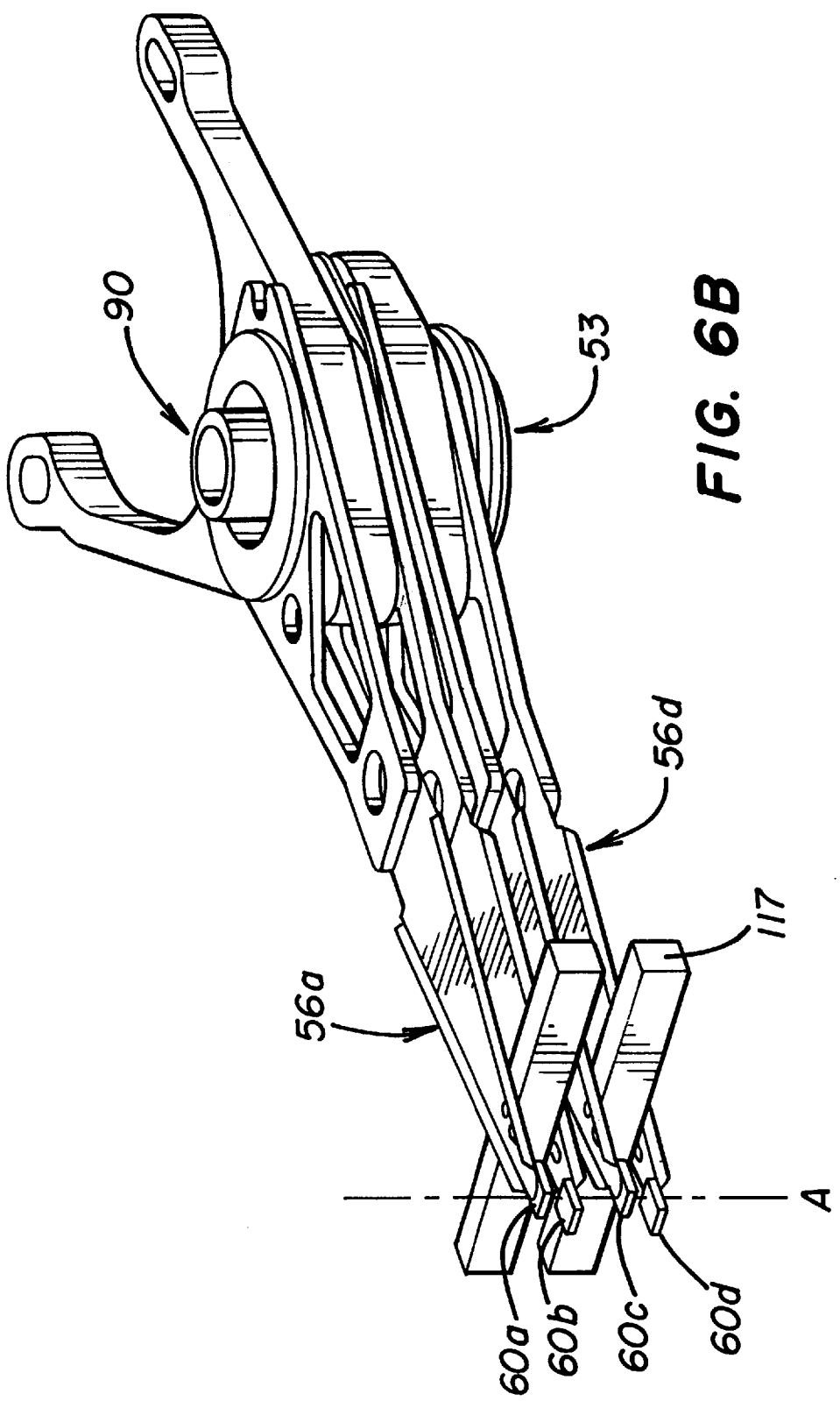

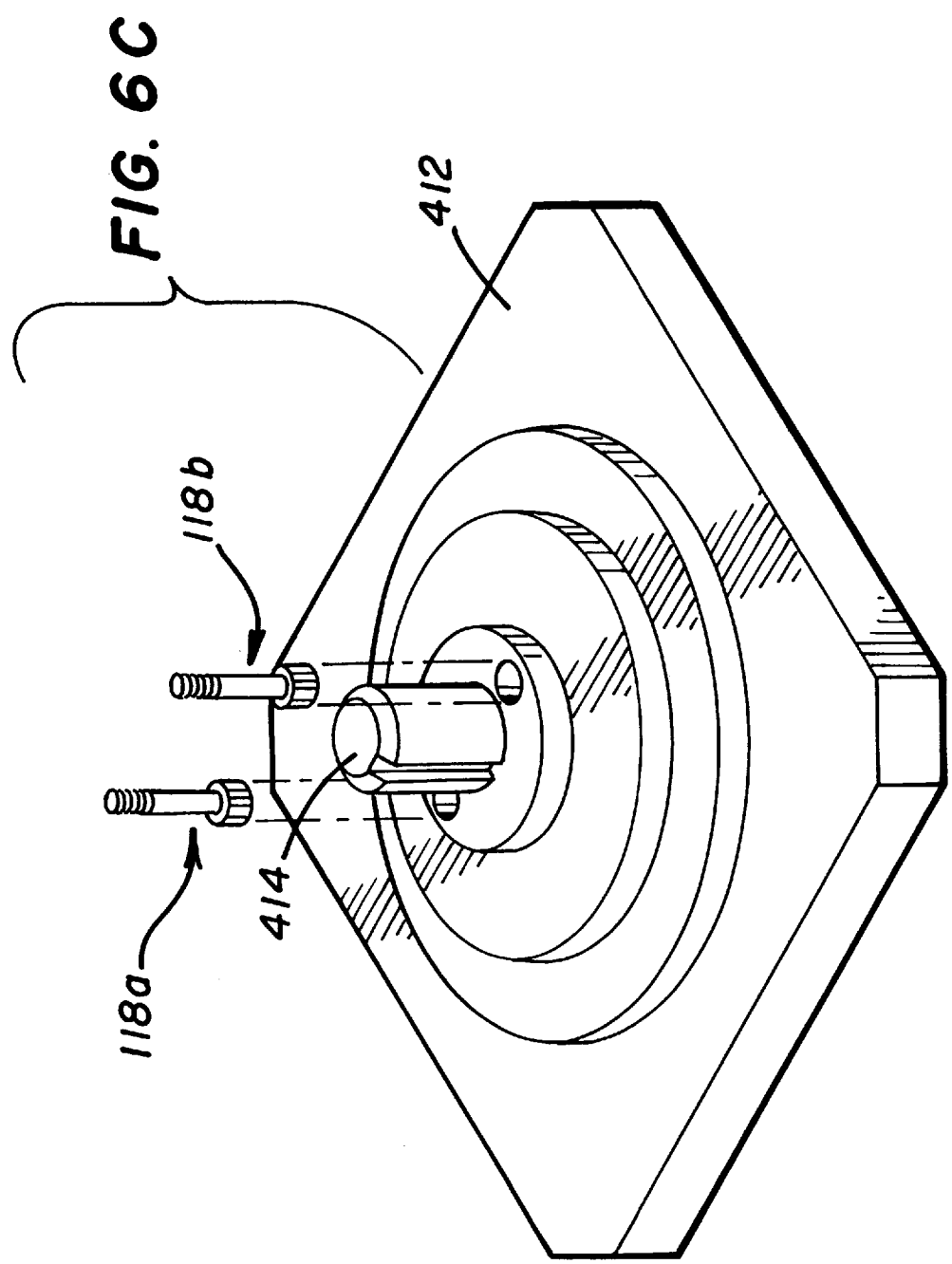

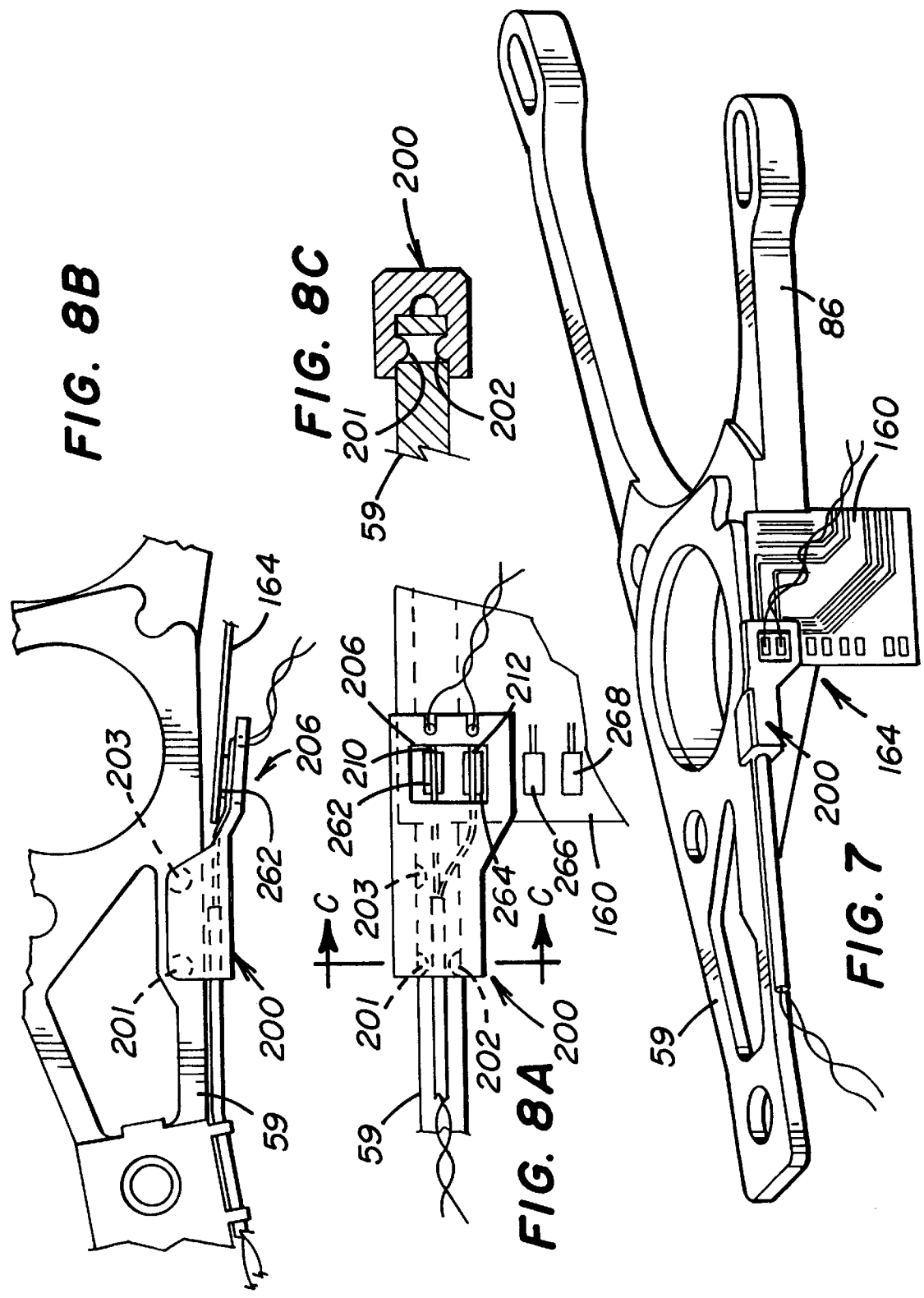

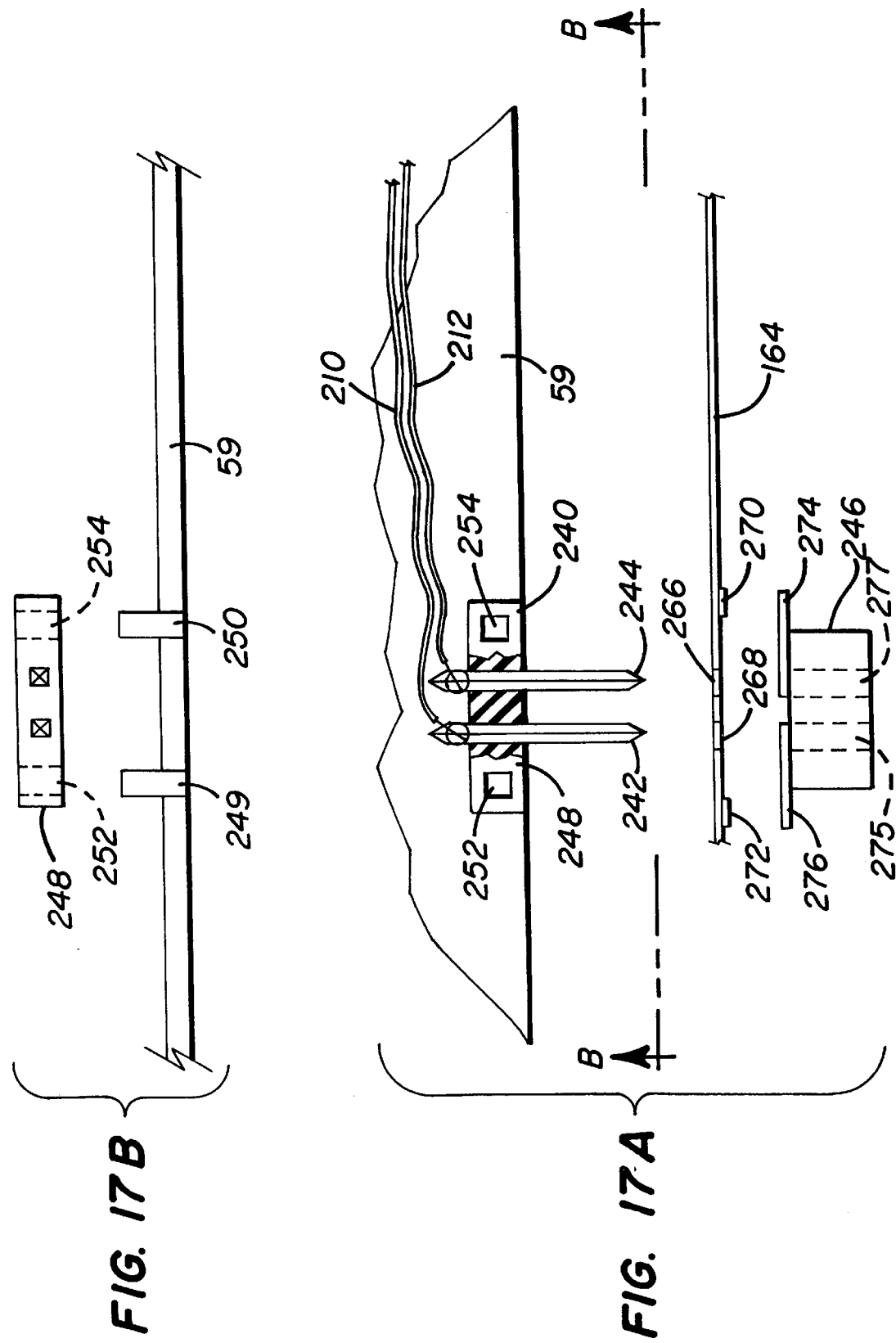

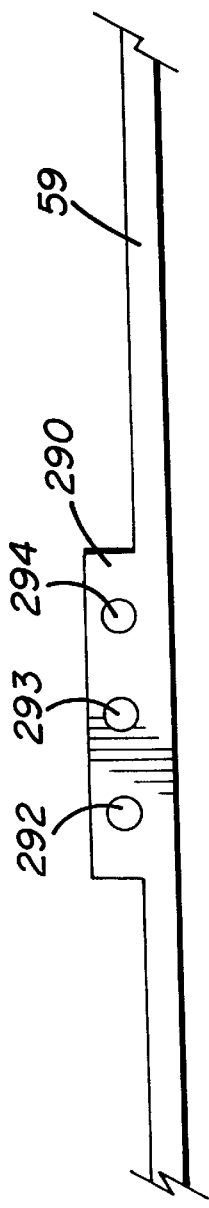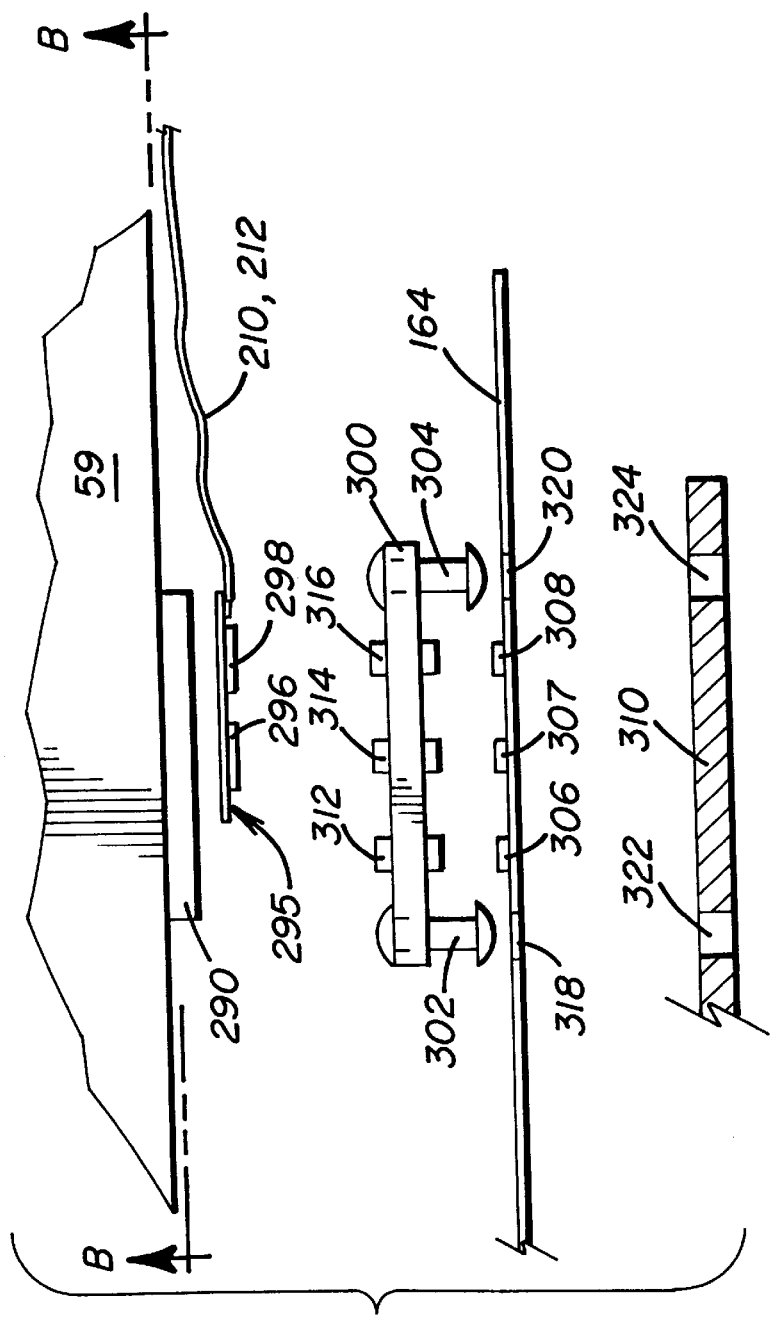
FIG. 18B
FIG. 18A

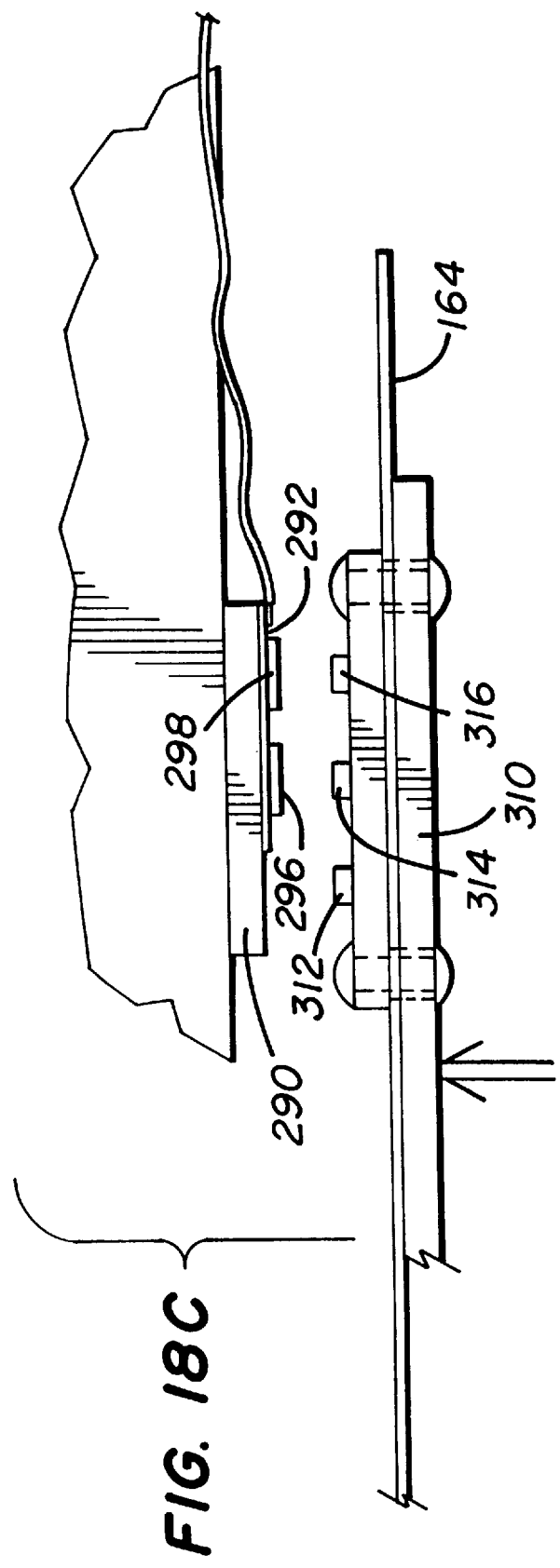

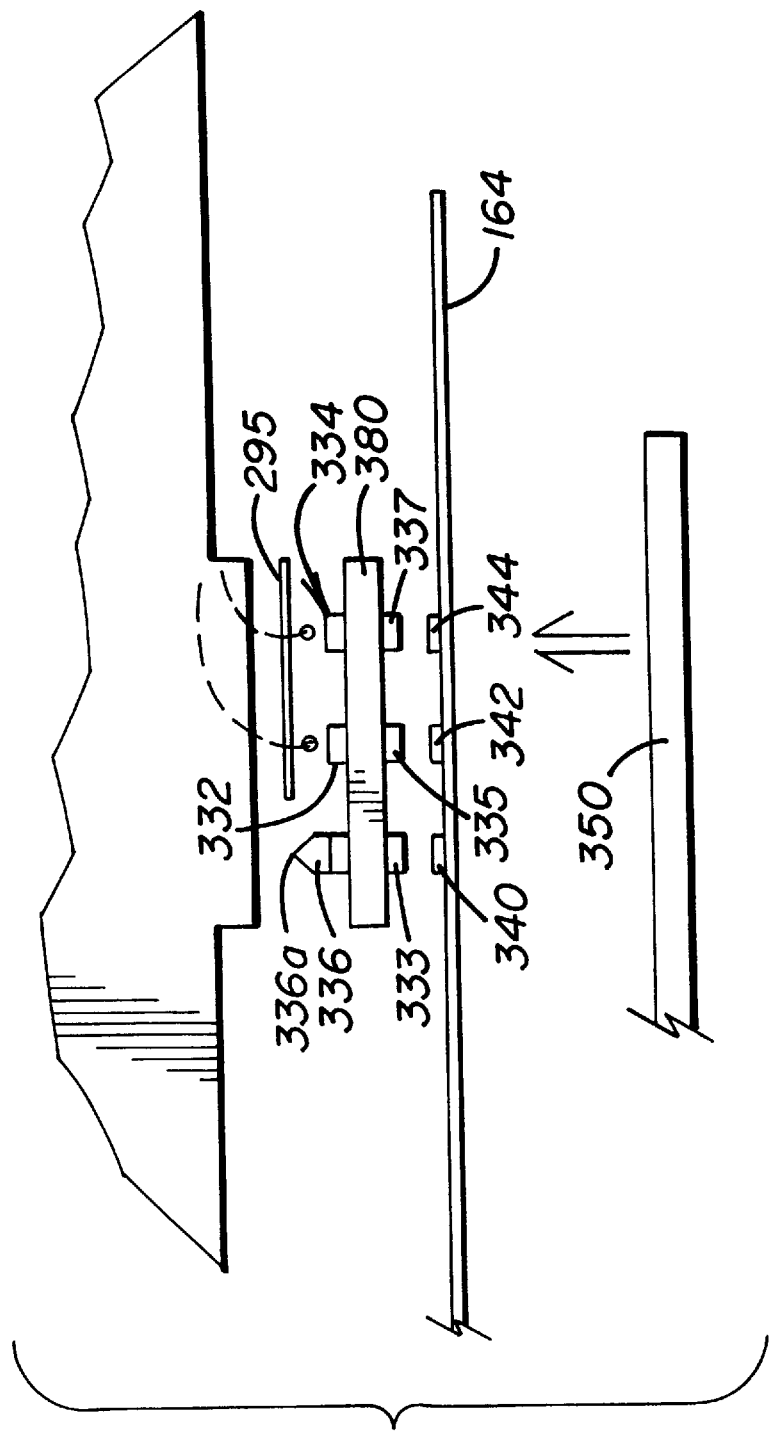

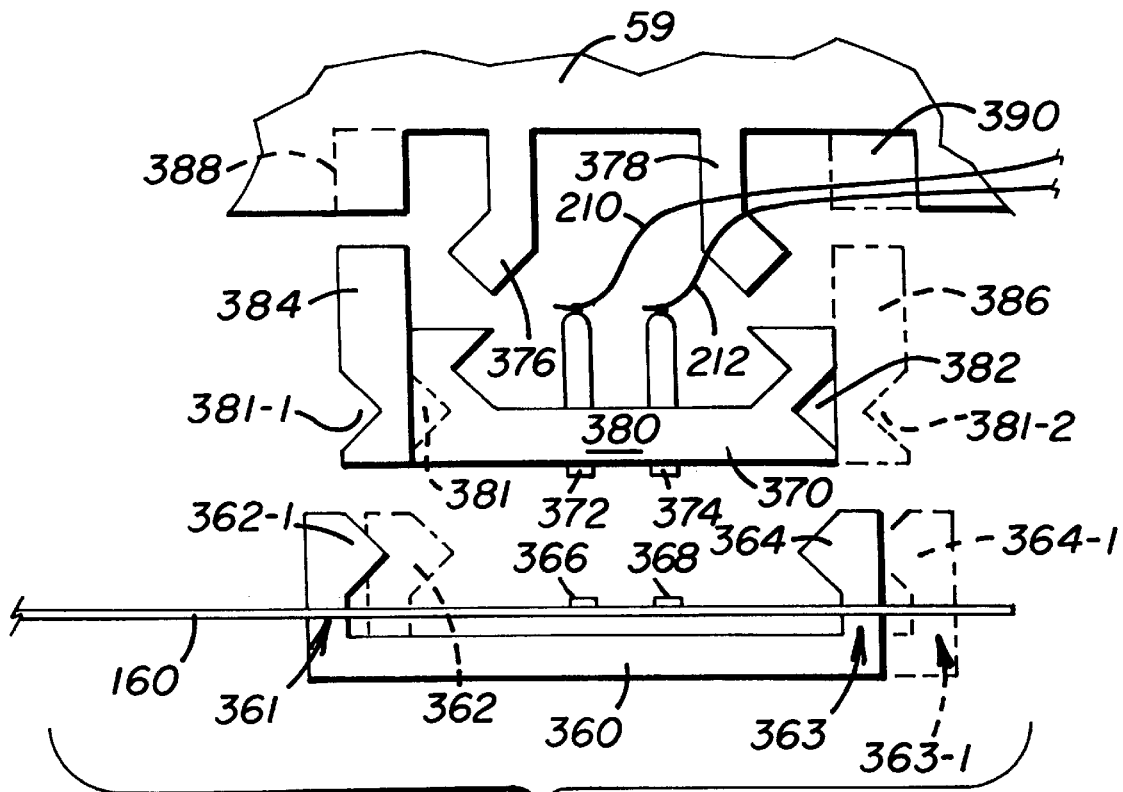
FIG. 20A
FIG. 20B
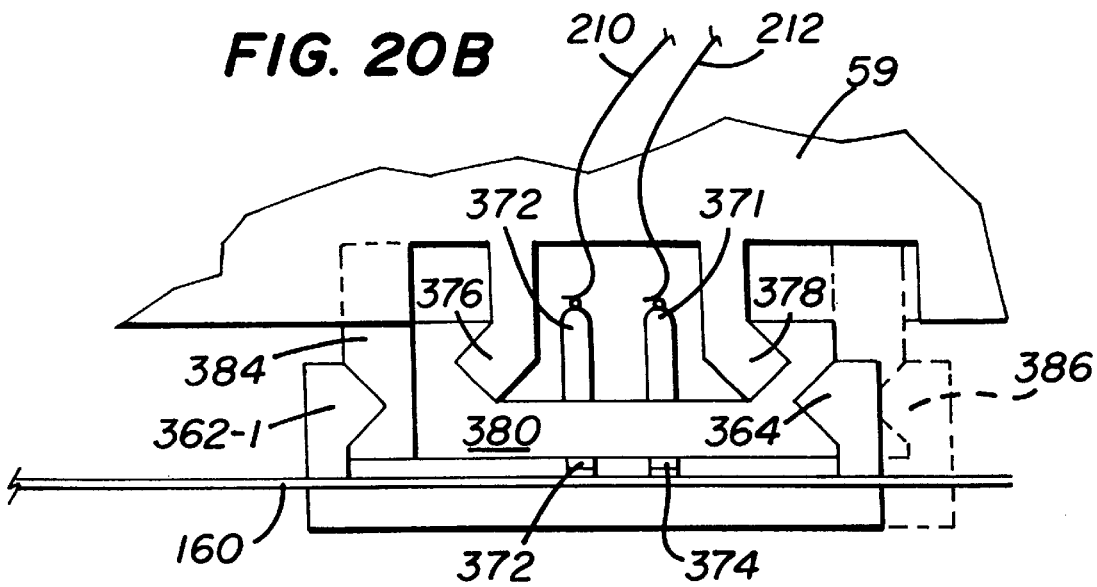

PART A

PART B

WIRE CARRIER FOR DISK DRIVE

This application is a continuation of Ser. No. 08/150,858, filed Nov. 12, 1993, now abandoned.

CROSS-REFERENCE TO RELATED APPLICATIONS

METHOD OF ASSEMBLING A DISK DRIVE ACTUATOR, U.S. Pat. No. 5,404,636, filed Nov. 12, 1993, inventors F. Mark Stefansky, Karl E. Hase, William J. Bryan, Mike Lerdal, Willian Repphen, Thomas Hogan and Walter Wong, owned by the assignee of the present application.

STACKABLE ACTUATOR ASSEMBLY HAVING SPRING RETAINING SYSTEM, U.S. patent application Ser. No. 08/511,526, filed Nov. 12, 1993, inventors F. Mark Stefansky, Karl E. Hase, William J. Bryan, and Mike Lerdal, owned by the assignee of the present application.

These applications are specifically incorporated herein by reference.

BACKGROUND OF THE INVENTION

1. Field of the Invention

The invention relates to disk drives, and specifically to improving the accuracy, speed and ease of manufacturing disk drives.

2. Description of the Related Art

Storage technology has followed a trend of increasing storage capacity while simultaneously decreasing the amount of physical space required to maintain such capacities. Market pressure has, in turn, driven the monetary cost per mega-byte of storage down. In order to maintain a market advantage, new drive designs incorporate greater efficiency in both design tolerance and manufacturability. Currently, disk drive manufacturers strive to achieve every bit of cost per unit of savings which can be reasonably achieved without serious technical performance losses.

A key aspect in reducing the cost of drives lies in improving manufacturability of individual components and in the assembly of these individual components into working drives. The disk drives generally include a data storage medium for the data, read/write heads for recording and retrieving the data, and some means for electrically interconnecting the heads and actuator to a controller which positions the heads with respect to the storage medium and directs the recording and retrieval of data therefrom.

One common format of data storage comprises the use of optical or magnetic disks. The disks are generally rotated in a housing while a read/write head, either an optical head or a magnetic head, transfers data to and from the storage medium. Generally, such heads are positioned with respect to the storage medium by the actuator between an inner limit, the inner diameter or "ID", and an outer circumferential limit, the outer diameter or "OD". A voice coil motor, comprising a magnet and coil assembly, or a stepper motor may be used to position the actuator and heads with respect to the disk medium.

Such actuators may be linear or rotary, each having specific advantages in the particular application used. In magnetic disk drives, rotary actuators have come to find a more prevalent usage. The actuator assembly includes a cast or extruded side facing "u" or e-shaped block (generally referred to as the e-block), usually made of aluminum or magnesium, to which load beams which support the read/write elements are attached. The e-block consists of a cylindrical section into which a bearing assembly is installed, two, three, or any number of identical and aligned arms extending from the cylindrical section at an evenly spaced distance apart, and some form of attachment for a stepper motor or voice coil motor component.

The controller must be electrically interconnected to the heads and the actuator in a manner which is reliable and cost efficient from a manufacturing point of view. Currently, because of the nature of the read/write heads, the heads are coupled to very small gauge lead wires which run along the length of the actuator arm to a flexible circuit (or flex circuit). Coupling of the electrical leads to the flex circuit takes place by way of soldering the leads to solder pads formed in the flex circuit. In some drives, the flex circuit is formed to attach to a portion of the actuator body, usually the cylindrical portion of the actuator body, and aligned so that the solder pads are at a point on the cylindrical body where the leads need only run down the arm to the point where the arm meets the cylindrical portion of the body and may thereafter attach to the solder pads.

The assembly operation of the actuator, and hence the drive as a whole, is a manually intensive operation. The alignment of the load beams and heads must be supervised and monitored by a human being, thus increasing the cost and decreasing the speed of assembly of the drives. Likewise, the attachment of the electrical leads to the flex circuit must be performed manually as no effective means has yet been found to automate the process.

SUMMARY OF THE INVENTION

Thus, an object of the invention is to provide a disk drive with improved manufacturability.

A further object of the invention is to provide a disk drive wherein manufacturing steps which are currently performed by human beings may be performed by automated processes.

A specific object of the invention is to provide a disk drive wherein establishment of the electrical interconnection between the read/write heads and the drive controller can be automated.

These and other aspects of the invention are provided in a member securing electrical conductors coupled to a read/write head in a storage device over conductive pads of an electrical flex circuit. Generally, the storage device includes an actuator having at least one actuator arm securing the read/write head, and the apparatus is coupled to the actuator arm.

In one embodiment, the apparatus comprises a member having a first end and a second end, the first end being coupled to the arm and the second end positioning the conductors over the conductive pads of the flex circuit. In a first arrangement, the second end includes a window securing the conductors in fixed positions over the conductive pads of the flex circuit. In another arrangement, the second end comprises a solderless coupling assembly electrically connected to the conductors, wherein the conductive pads of the flex circuit are arranged to electrically couple to the solderless coupling assembly.

The wire carrier of the present invention allows the process of coupling the electrically conductive wires coupled to the heads to automatically be connected to a flexible circuit and the drive electronics. This allows automation of the coupling process, as the head wires are automatically located over conductive pads on the surface of the flexible circuit.

BRIEF DESCRIPTION OF THE DRAWINGS

The invention will be described with respect to the particular embodiments thereof. Other objects, features, and advantages of the invention will become apparent with reference to the specification and drawings in which:

FIG. 1E is a cross-sectional view of a second motor assembly suitable for use in the disk drive.

FIG. 4A is a plan view of an arm plate of the arm assembly of the present invention.

FIG. 4B is a side view of an arm assembly in accordance with the present invention.

FIG. 4C is a plan view of a second embodiment of an arm assembly in accordance with the present invention.

FIG. 5 is an exploded perspective view of second actuator arm assembly in accordance with the present invention.

FIG. 6B is a perspective view of the actuator assembly of FIG. 5 with the arm assemblies rotated into alignment.

FIG. 6C is an isometric view of a pallet suitable for use in fabricating the actuator of the present invention.

FIG. 7 is a perspective view of one arm of the actuator assembly with a first embodiment of a wire carrier in accordance with the present invention.

FIG. 8A is a side view of a portion of the actuator arm of FIG. 7.

FIG. 8B is a view along line A—A of FIG. 6A.

FIG. 8C is a top view of the wire carrier shown in FIG. 7.

FIG. 17A is a top view and FIG. 17B a side view, along line B—B in FIG. 17A, of a second embodiment of a solderless wire coupling assembly suitable for use with the wire carrier of the present invention.

FIG. 18A is an exploded, top view of a second embodiment of a solderless wire coupling assembly suitable for use with the wire carrier of the present invention.

FIG. 18B is a view along line B—B in FIG. 18A.

FIG. 18C is an assembled, top view of the second embodiment of a solderless wire coupling assembly suitable for use with the wire carrier of the present invention.

FIG. 19 is an exploded, top view of a third embodiment of a solderless wire coupling assembly suitable for use with the wire carrier of the present invention.

FIGS. 20A and 20B are an exploded, top view, and an assembled top view, respectively, of a solderless wire coupling assembly suitable for use with the wire carrier of the present invention.

DESCRIPTION OF THE PREFERRED EMBODIMENTS

Figure 1A:
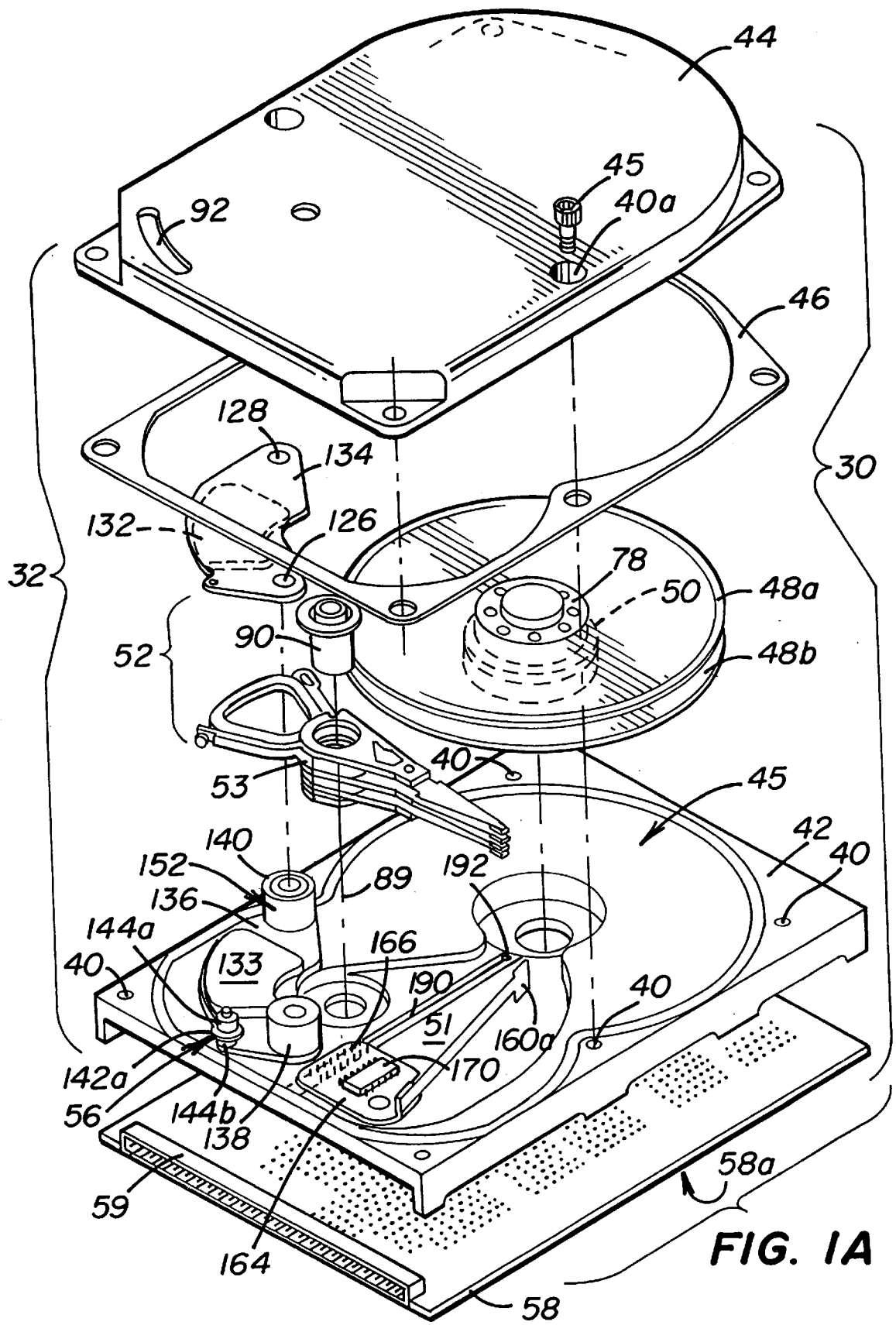
FIG. 1A is a perspective view of a disk drive in accordance with the present invention.

An architecture for an automated disk drive assembly and a method for assembling the disk drive architecture will be described with reference to FIGS. 1–23. It should be recognized that while certain specific features of the invention will be described herein, the principles of the invention are equally applicable to numerous sizes, types, and technologies utilized in data storage devices incorporating the field of storage technology.

The disk drive described herein includes, for example, two hard disks, each with a magnetic coating and utilizing Winchester technology; however, the disk drive may utilize various numbers of disks (and a corresponding number of heads, usually one per disk surface, i.e., two (2) heads per disk) including a single disk. In addition, the drive of the present invention may incorporate other types of disks, for example, optical disks, and other read/write technologies, for example, lasers.

In one aspect, the disk drive includes a novel means for securing electrical conductors coupled to the read/write heads over termination pads on a flexible circuit. The flexible circuit is designed to couple the signals from the heads to a printed circuit board having control electronics provided thereon. This allows automation of the actuator assembly process, an increase in efficiency of drive manufacture, and a decrease in the cost associated with producing the storage device.

Overall Drive Architecture

As shown in FIGS. 1A–1E a disk drive 30 in accordance with the present invention includes two main components, a head-disk-assembly (HDA) 32 and control electronics 34 which provide control signals to HDA 32, receive data signals from and transmit data signals to HDA 32, and interface the disk drive 30 with a host system. The host system may be, for example, a personal computer configured in a tower or desk-top casing, or a portable or laptop computer.

HDA 32 includes a base 42 and a cover 44. A gasket 46 is provided between base 42 and cover 44 to establish a sealed (or controlled) environment between base 42 and cover 44. Cover 44 is secured to base 42 by a plurality of socket head screws 45 provided through bores 40a in cover 44 into threaded bores 40. Disk drive 30 does not utilize a breather filter, and the seal provided by gasket 46 isolates the sealed environment from ambient atmospheric conditions and pressures. The seal provided by gasket 46 is stable at pressures experienced at altitudes from 200 feet below sea level to 15,000 feet above sea level during operation of the disk drive.

The components provided in the controlled environment established by HDA 32 include disks 48a, and 48b, a spin motor 50 for rotating disks 48a–48b, an actuator assembly 52 for reading data from and writing data to disks 48a–48b, a header assembly 54 for transferring electronic signals to and from the controlled environment established in HDA 32, and a latch assembly 56 for parking actuator assembly 52.

Control electronics 34 are provided on a printed circuit board (PCB) 58. Electronic elements 34 are provided on the bottom surface 58b of PCB 58. The control electronics 34 control the operation of spin motor 50, the operation of actuator assembly 52, and the transfer of data to and from disk 48. PCB 58 is mounted to base 42 and electrically grounded to the HDA 32. The dimensions of disk drive 30 are shown in FIGS. 1B and 1C, and Table 1.

The above-described basic structure of disk drive 30 provides protection from shock and vibration. In particular, disk drive 30 will withstand non-operating shocks on the order of 300 g's and operating shocks, without nonrecoverable errors, of 10 g's. Non-operating vibration of 5.0 g's in the range of 10–400 Hz is the specified tolerable limit. Operating vibration, without nonrecoverable data, is specified at 0.5 g's for the range of 10–400 Hz.

Header Assembly

Figure 1B:
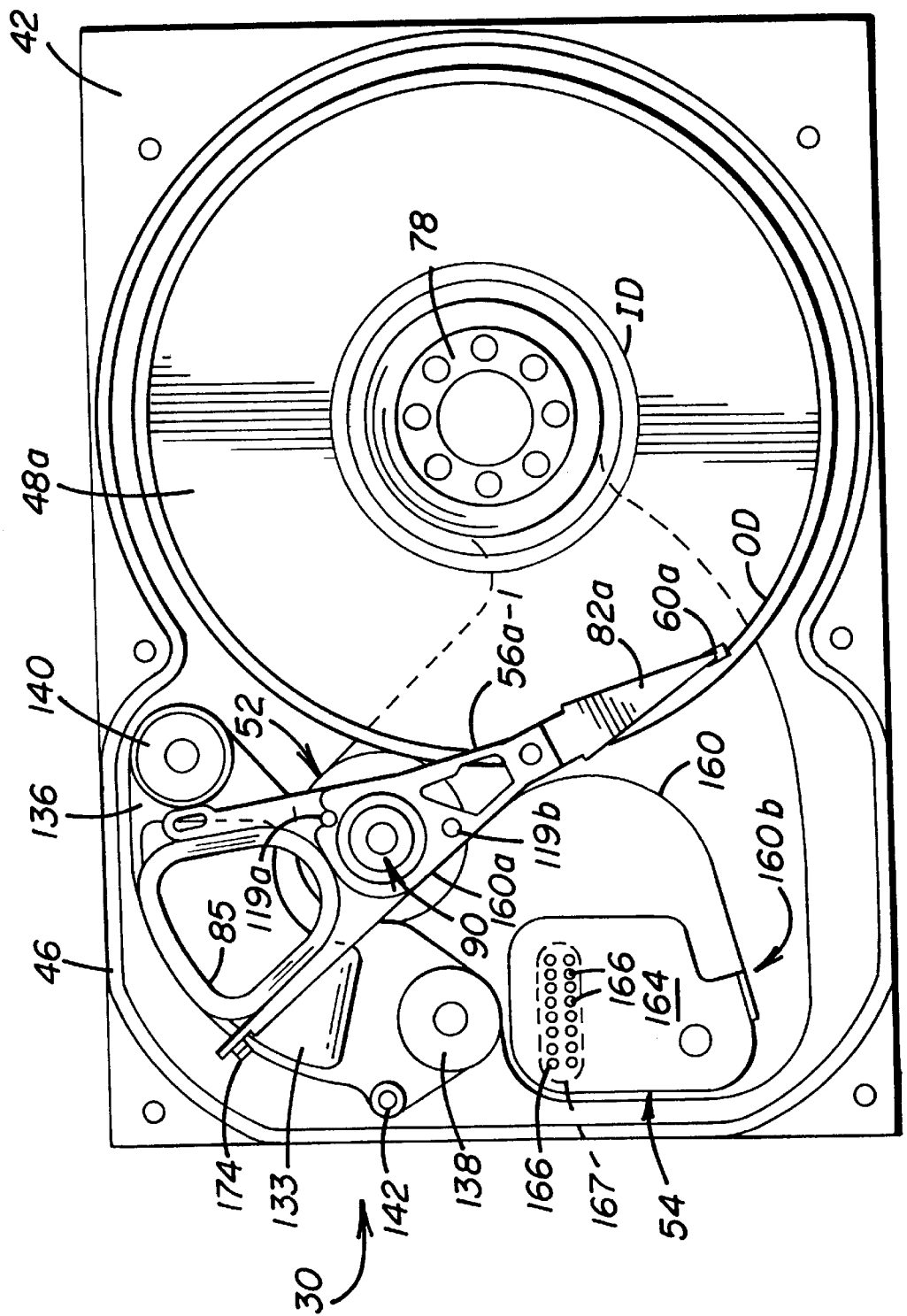
FIG. 1B is a plan view of a disk drive in accordance with the present invention.
Figure 1C:
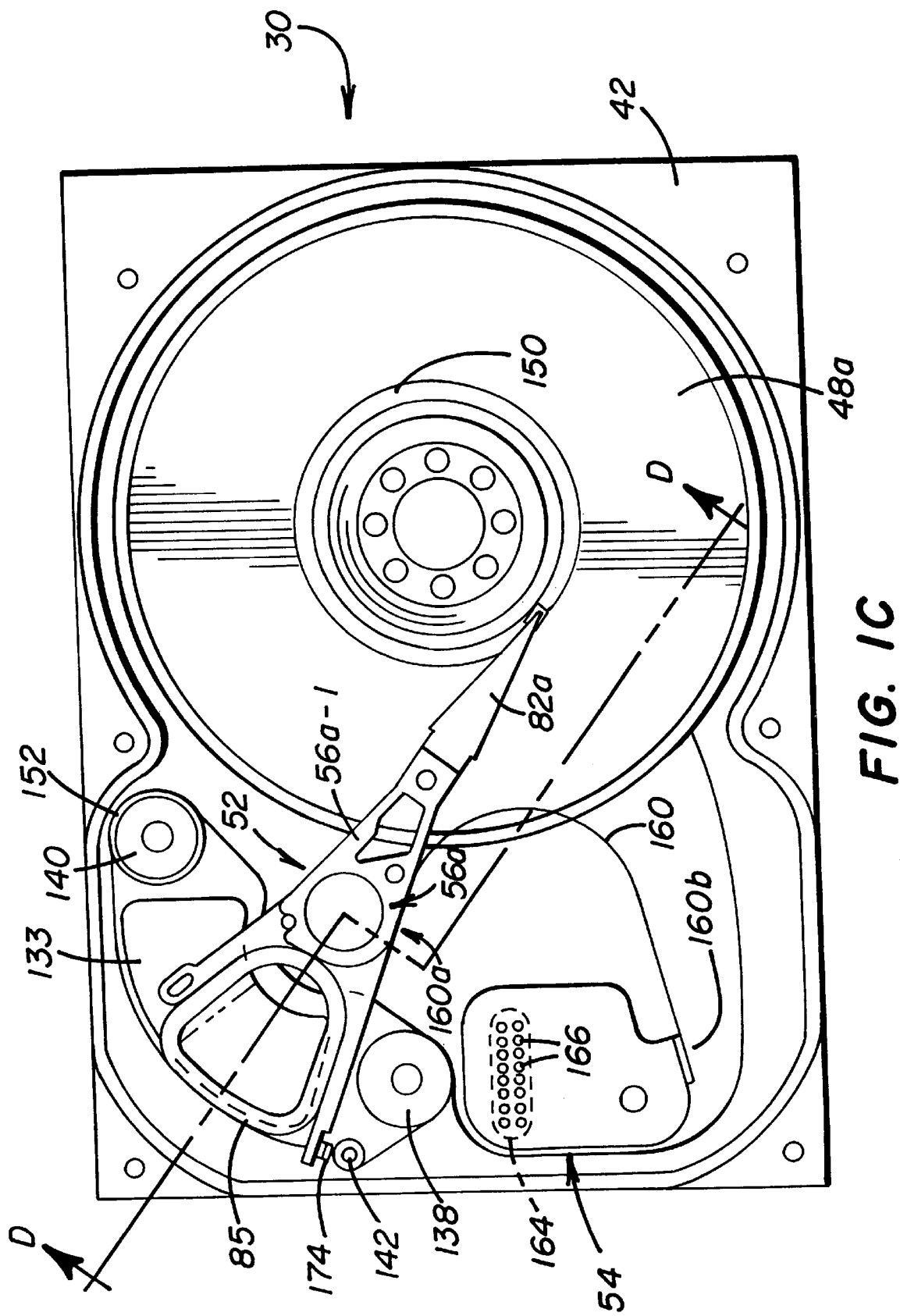
FIG. 1C is a second plan view of the disk drive.

With reference to FIGS. 1A–1C, the header assembly 54 will be hereafter described. Header assembly 54 couples PCB 58 to the internal components of drive 30 in the controlled region between base 42 and cover 44. Header assembly 54 electrically couples to flex circuit 160 to provide electrical connections to heads 60, 61, and actuator coil 85 mounted on rotating actuator arm 82. A spin motor flex circuit 190 is also electrically coupled to header assembly 54 to transfer motor control signals from PCB 58 to spin motor 50.

The main components of header assembly 54 are header 162, flex circuit bracket 164 and flex circuit 160. Header 162 includes copper connector pins 166 molded to a plastic base 167. Header 162 is press fit into socket 168 in base 42. Bracket 164 has a base portion 168a and an arm portion 168b which secures a head signal pre-amp chip 170 and flex circuit 160. In general, head signal pre-amp chip 170 is coupled to second end 160b of flex circuit 160 prior to installing the circuit in drive 30.

As shown in FIGS. 1B–1C, flex circuit 160 is a reverse flex circuit and is secured to actuator body 110 with a screw 162a in bore 162b to reduce the adhesive necessary to secure components in drive 20. Pins 166 engage corresponding pin holes (not shown) on PCB 58.

Spin motor flex circuit 190 lies on the bottom of base 42 and is secured to three of the pins 166 on the bottom surface 42b of base 42 as shown in FIG. 1B. Flex circuit 190 is secured to base by an adhesive or a screw (not shown).

Actuator Assembly

Actuator assembly 52 (FIGS. 2–15) performs the function of positioning heads 60a–d with respect to disks 48a–48b. An actuator coil 86 is mounted at a second end of actuator assembly 52. Actuator assembly 52 comprises actuator arm assembly 53 and bearing cartridge 90. Actuator arm assembly 53 is mounted on base 42 on an actuator post 88 and bearing cartridge 90, is secured to and over actuator post 88. Actuator post 88 is provided through a bore 88a in base 42.

Figure 2:
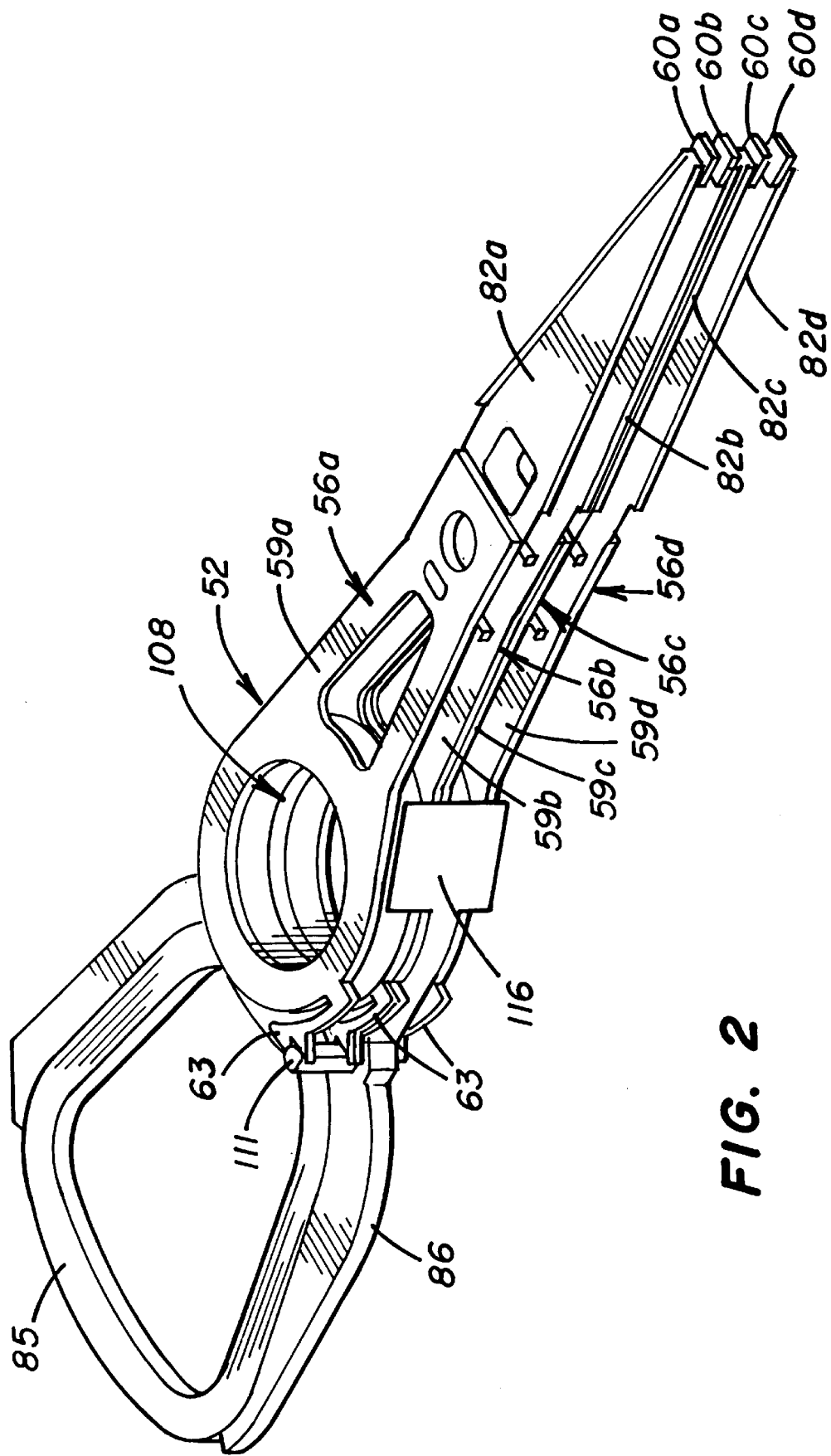
FIG. 2 is a perspective view of a first embodiment of an assembled actuator arm assembly in accordance with the present invention.

FIG. 2 shows a perspective view of the first embodiment of an actuator arm assembly 53 suitable for use in accordance with the disk drive of the present invention. Actuator arm assembly 53 is comprised of a plurality of head arm assemblies 56a–56d. The head/arm assembly is comprised of an arm plate 59, and a load beam 82 to which heads 60a–60d are attached. Each load beam 82 is welded to arm plate 59. This allows alignment of the load beam 82 and arm plate 59 to be performed prior to final assembly of actuator assembly 52. In addition, heads 60 can be aligned on load beam 82 and the load beam and head attached to arm plate 59.

Figure 3:
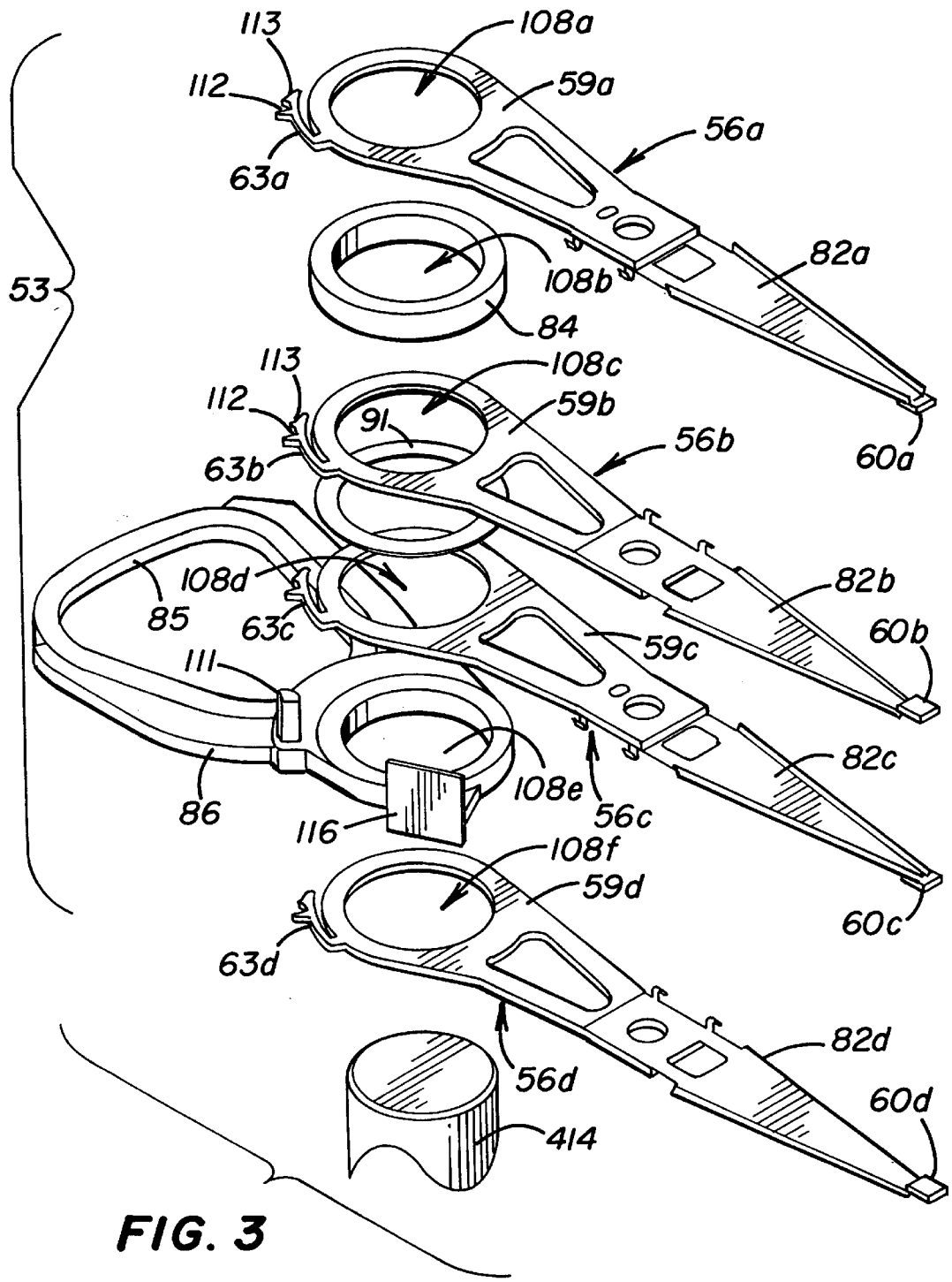
FIG. 3 is an exploded perspective view of an actuator arm assembly in accordance with the present invention.

Shown in further detail in FIG. 3 are a spacer 84 and spacer/yoke 86. Spacer/yoke 86 serves as a spacer between arm assemblies 56c and 56d, a mounting surface for flex circuit 164, and a yoke for coil 85. Plate 116 on spacer/yoke 86 serves as the mounting surface for one end of flex circuit 160. Centralized bores 108a–108e are provided in arm plates 59, spacer 84, and yoke/spacer 86 to form a cavity 108 for receipt of bearing cartridge 90 after actuator arm assembly 53 has been assembled. Plate 116 is coupled to yoke/spacer 86 and serves as the mounting surface for flex circuit 160.

Each load beam 82 is spot welded to each arm 59. This operation may be out-sourced by a drive manufacturer to a suspension manufacturer. The welding process utilized to attach load beams 82 to arms 56 is the same process utilized to weld load beams to base plates in conventional suspensions. Load beams 82 are, for example, type 14 manufactured by Hutchinson, having down facing rails. Flexures on the respective load beams support respective ones of head 60a–60d. In addition, attachment of the read/write head to the load beam is an operation which may be out-sourced, so that each head/arm assembly 56 is received from a vendor in an assembled condition including head 60, load beam 82 and arm plate 59, thereby suitable for installation into a disk drive. Each head/arm assembly 56 may be positioned so that arm plates 59 are flush with respect to each other (as in arms 59b, 59c) or the mounting surfaces of yoke spacer 86 (as in arms 56c, 56d) and spacer 84 (arms 56a, 56b). Alternatively, a second spacer 91 may be placed between plates 59b, 59c which tends to reduce vibration in the head arm assembly. Spacer 91 is on the order of 0.014" thick. Actuator bearing cartridge 90 is sized to be inserted into bore 108 in arm assembly 53. A lock collar 123 (FIG. 5) secures actuator arm assemblies 56a, 56b, 56c, and 56d, by sandwiching plates 59a, 59b, 59c, 59d between lock collar 123 and a lip 103 on outer member 102 of bearing cartridge 90. As discussed in detail below, bores 108a–108d allow plates 56a–56d to slip over a precision arbor 414 on a pallet during the assembly process. Actuator arm assembly 53 is thereafter secured by the bearing cartridge, and/or a fastener, as discussed below.

Figure 1D:
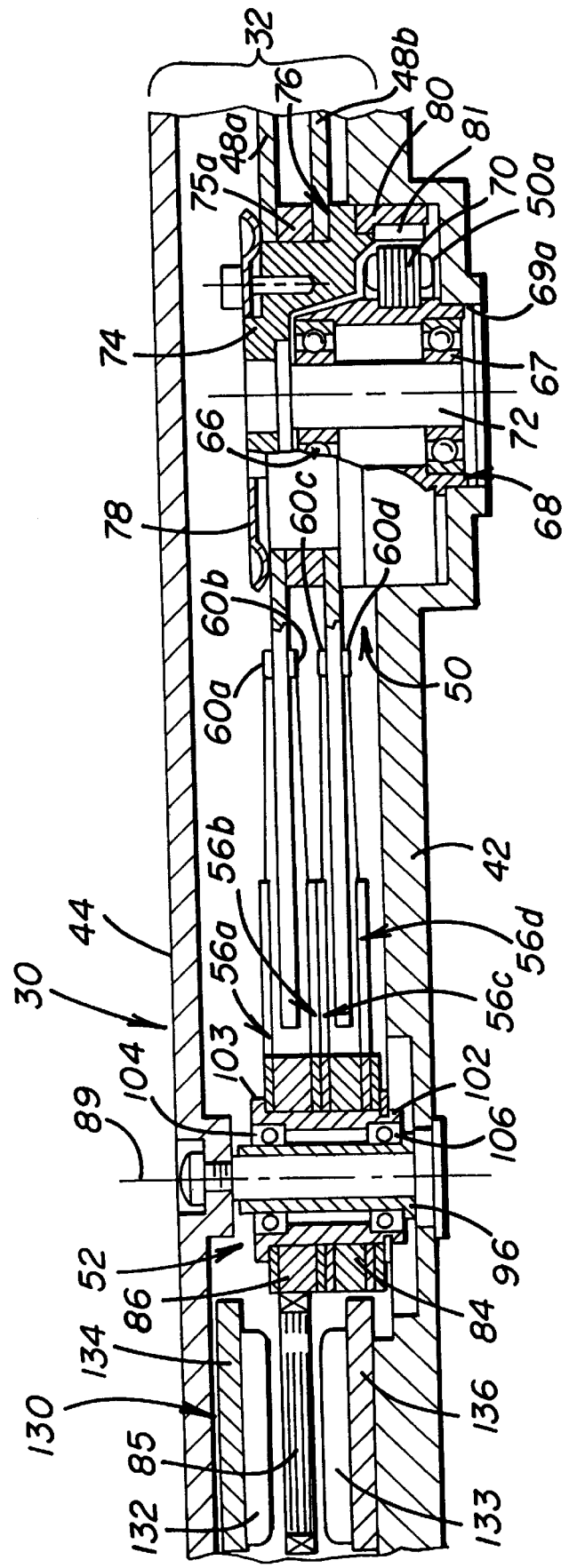
FIG. 1D is a cutaway view along line D—D in FIG. 1C of the disk drive of the present invention.

As shown in FIG. 1D, bearing cartridge 90 includes inner member 96, bearings 104, 106, outer member 102 and lock ring 123. Inner member 96 slips over actuator post 88 and has a mounting surface 98 which interfaces with top surface 100 of post base 92. Outer member 102 of bearing cartridge 90 is rotatably mounted about inner member 96 by first and second bearings 104, 106.

Inner member 96 and outer member 102 are generally manufactured from 300 Series stainless steel. Bearings 104, 106 are lubricated with a 40 micron filtered Nigrace grease, and the inner rail thereof is affixed to the inner member 96 the application of a high strength cured adhesive, such as Locktite 661N. Outer member 104 includes a lip 103 around the circumference thereof which is utilized to secure the assembled bearing cartridge 90 in bore 108 of arm assembly 53 after bearing cartridge 90 is fit into bore 108. A spacer 124 and lock ring 123 secure actuator bearing cartridge 90 in arm assembly 52 and secure head/arm assemblies 56a–56d from vertically separating. As shown in FIG. 1C, lip 103 engages the top surface of head/arm assembly 56a as bearing cartridge 90 is placed in hole 108. Spacer 124 is inserted over cartridge 90 and engages the bottom surface of head/arm assembly 56d. Lock ring 123 engages notch 125 in cartridge 90 when cartridge 90 is mounted in bore 108, and secures arm assembly 53 between lip 102a and spacer 124. A well region 64 is provided in base 42, to allow for maximum stiffness of base 42 but provide sufficient clearance for head/arm 56d and head 60a on the lower surface of disk 48a.

A unique feature of the actuator arm assembly 53 is the manner in which the individual head/arm assemblies 56 are secured. Each arm plate 59 includes a leaf spring 63 which engages a mounting post 111 and retains each head/arm assembly 56 in a secure, fixed position. Leaf spring 63 also provides for a novel method of assembly of actuator assembly 52. As shown in FIG. 4, leaf spring 63 includes a notch 112 which engages shaft 111 and, in conjunction with the force of leaf spring 63 away from bore 108, secures each head/arm assembly 56 with respect to spacer/yoke 86. Consequently, no fasteners, other than clip ring 123, need be used to secure actuator assembly 52. Naturally, the position of arm assemblies 56a–56d relative to spacer/yoke 86 is the most significant positional relationship; if all head/arm assemblies 56 are secured against rotation out of alignment with respect to yoke/spacer 86, the rotational alignment of heads 60a–d in actuator assembly 52 will be maintained when actuator arm 53 rotates under the force induced in coil assembly 85.

One end of leaf spring 63 is coupled to arm plate 59, while the second end includes a beveled lead edge 113. Edge 113 of leaf spring 36 is beveled so that, during the assembly operation, the leaf spring will flex toward the center of bore 108 and allow mounting post 111 to slip into notch 112.

FIG. 5 represents an alternative embodiment of actuator assembly 52 including actuator arm assembly 53-1 wherein head/arm assemblies 56a-1, 56b-1, 56c-1, and 56d-1 all include additional through bores 114a–d, 115a–d which may be utilized to secure head/arm assemblies 56a-1 through 56d-1 against lateral rotation through the use of fasteners, rather than through the leaf spring and post arrangement of assembly 53. A feature of the second embodiment of the actuator arm assembly 53-1 is that fasteners 118a, 118b are used to prevent rotation of the head/arm assemblies with respect to each other. Each fastener 118a–b may each comprise a threaded bolt coupled to a nut 119a–b. As discussed below, fasteners 118a–b allows actuator arm assembly 53 to be rotated so that heads 60a–d are aligned, with fasteners 118a–b thereafter securing head/arm assemblies 56a-1 through 56d-1 of actuator arm assembly 53-1 prior to insertion of bearing cartridge 90. Fasteners 118a–b serve to retain the alignment of the head/arm assemblies.

Vertical retention of the actuator arm assembly is provided by clip ring 123 and lip 103.

A second variation of the second embodiments shown in FIG. 5 is the relative placement of spacer/yoke 86-1 and spacer 84-1. As will be noted therein, the respective positions of these two elements have been reversed with respect to the assembly shown in FIG. 3, as a matter of design choice. Placement of the spacer/yoke and arm spacer is a design choice dependent on the structure of the spacer/yoke, the number of arms, the size of the actuator coil and the magnet structure, and the thickness and number of permanent magnets utilized in the voice coil motor assembly.

Assembly of the Actuator

The aforementioned embodiments structure of actuator assembly 52 provide a unique and cost-effective method by which to manufacture the actuator in an automated process. This allows synchronization of manufacturing of the actuator assembly at a point in time during the overall manufacturing process of the disk drive which is concurrent with the assembly of the disk drive architecture as a whole. This results in a reduction of contaminants in the disk drive since assembled actuators need not be provided from a second source vendor, and have less opportunity to accumulate contaminants during the shipping and manufacturing process. Furthermore, the drive manufacturer can maintain more accurate control over the environment in which the actuator assemblies are maintained. Secondly, less time expires between completion of the actuator assembly process and the placement of the assembled actuator into a contaminant-free environment within the drive.

A still further advantage is the fact that the drive manufacturer has an opportunity to inspect and test head/arm assemblies 56, provided from the outsource vendor, prior to their assembly into a completed head stack. Traditionally, the out-source vendor supplies an assembled actuator with the heads, load beams, and E-block attached and aligned by the vendor. If inaccuracies exist in the component, there is no opportunity to correct these problems. The actuator assembly of the present invention allows the drive manufacturer to maintain better accuracy in terms of the gram loads, static attitude (pitch and roll) of the heads, flexures, and mounting plates used in the actuator by testing the head/arm assemblies prior to construction of the actuator.

Figure 6A:
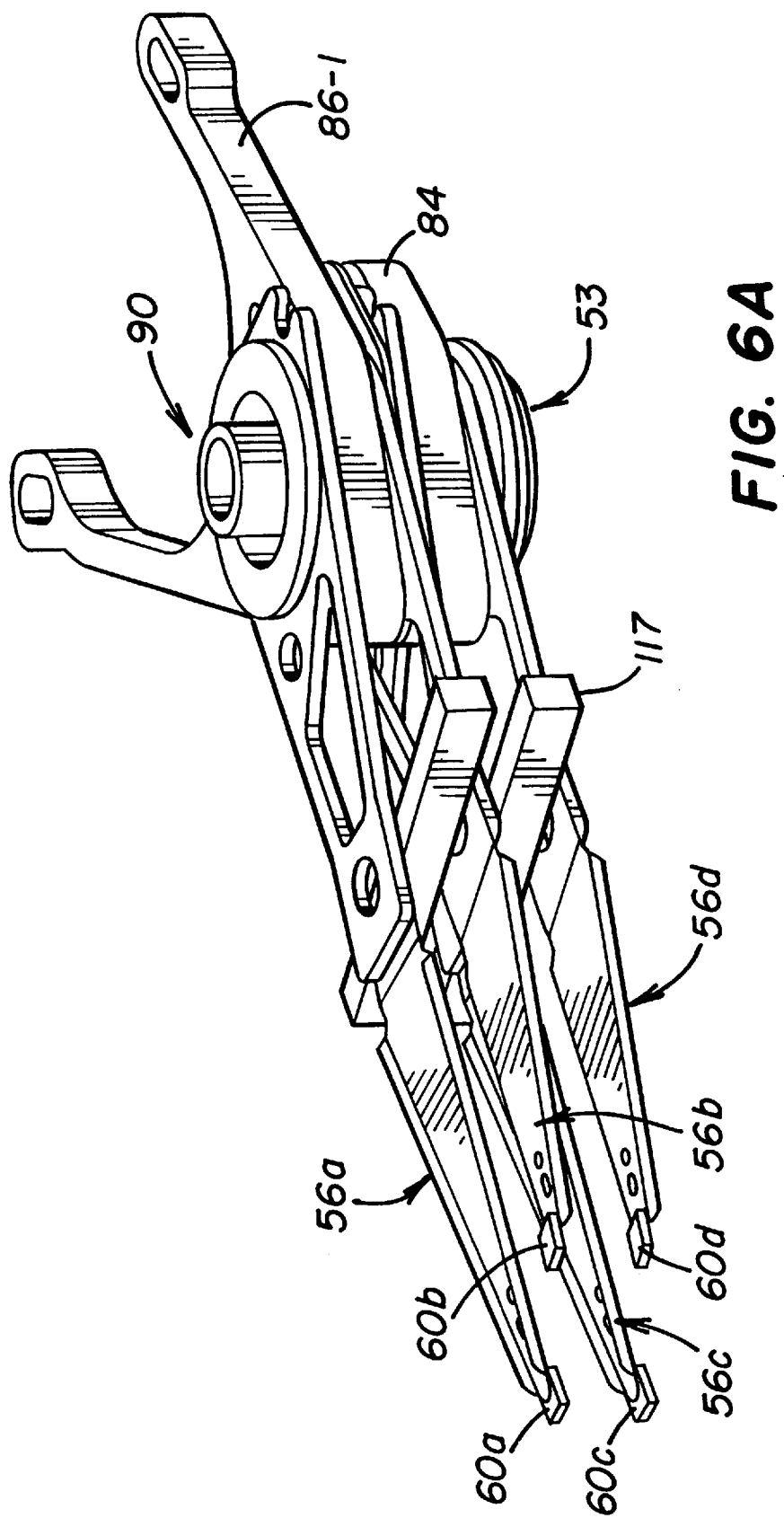
FIG. 6A is a perspective view of the actuator assembly with the arm assemblies rotated out of alignment.
Figure 9:
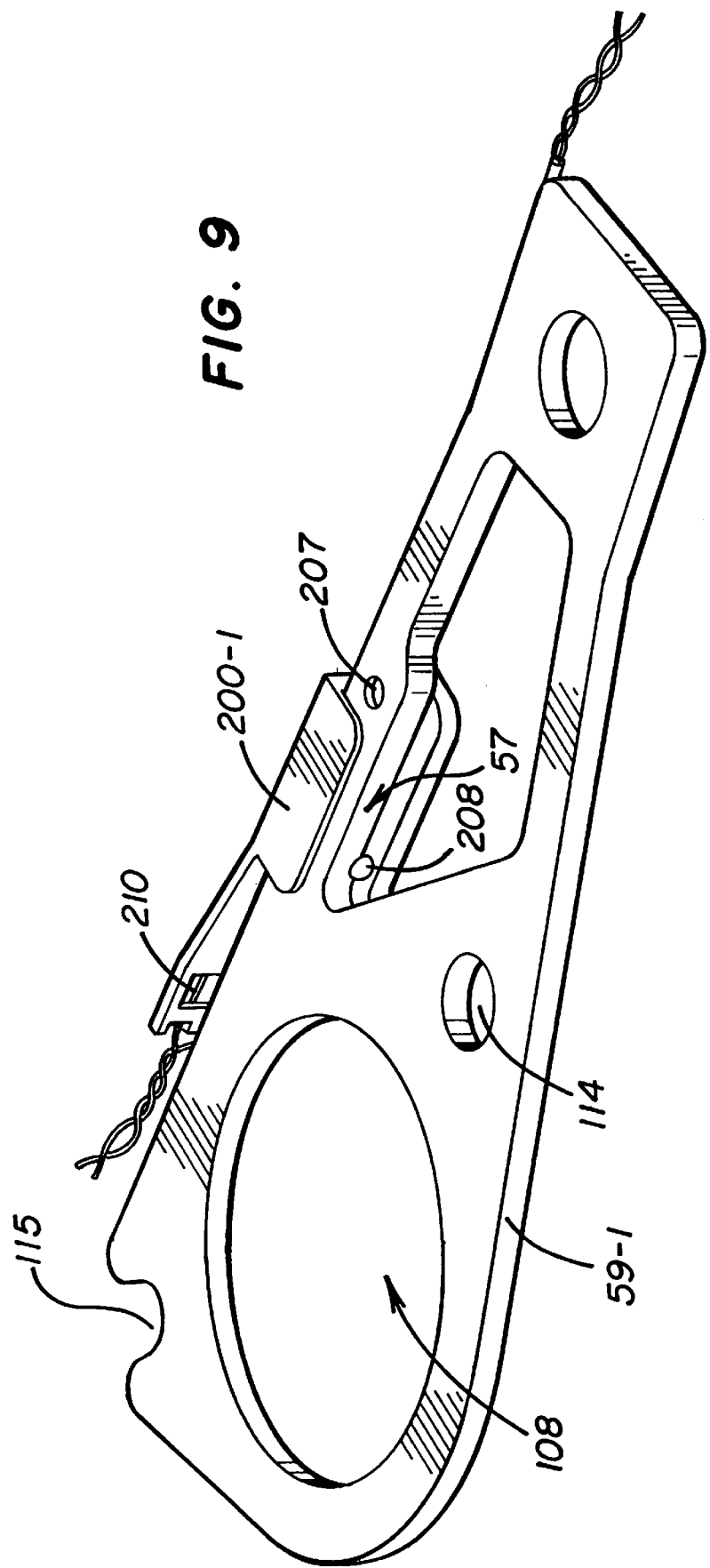
FIG. 9 is a first perspective view of the first embodiment of the wire carrier attached to a mounting arm in accordance with the actuator assembly described herein.
Figure 10:
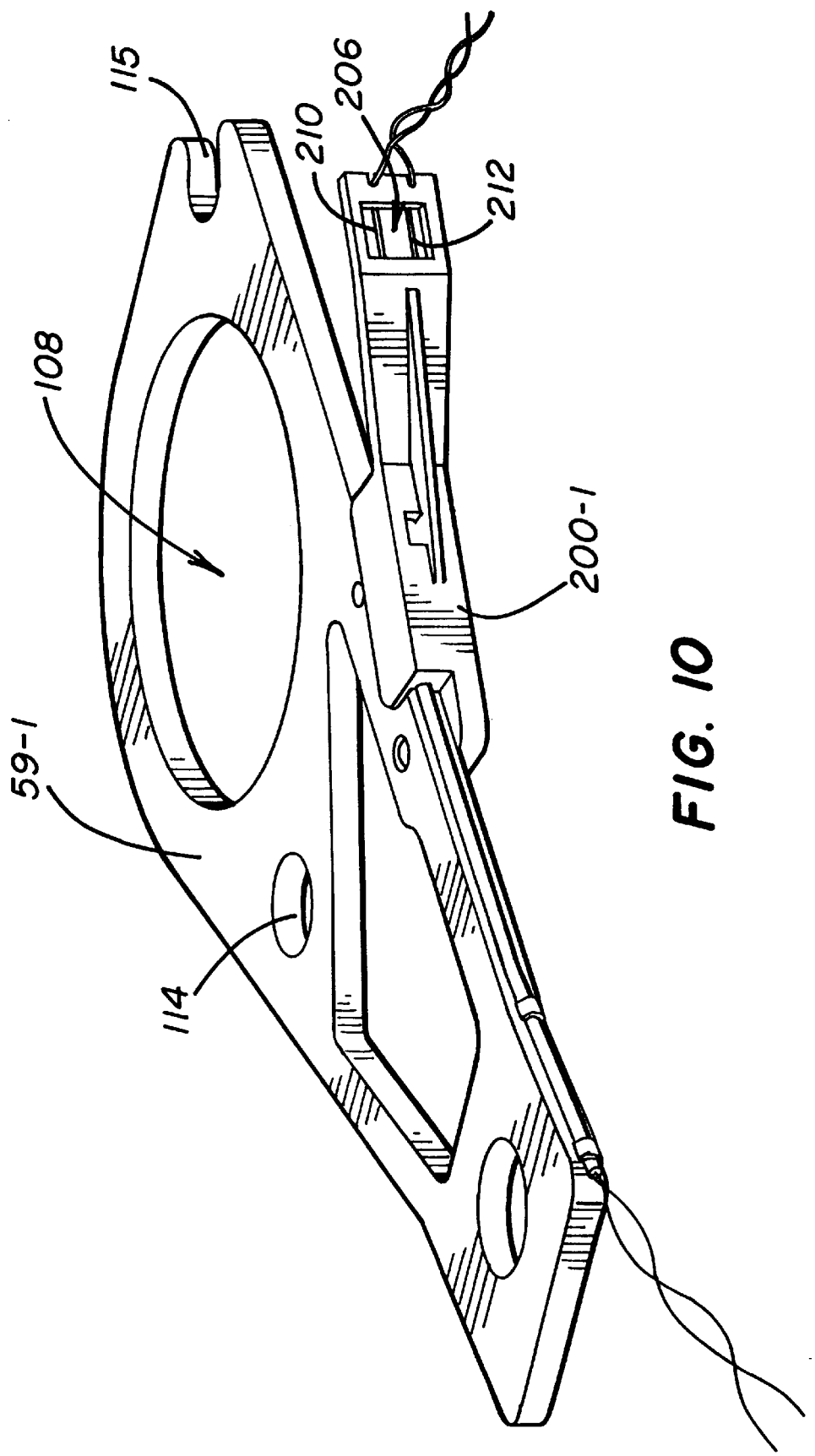
FIG. 10 is a second perspective view of the first embodiment of the wire carrier attached to a mounting arm.
Figure 11:
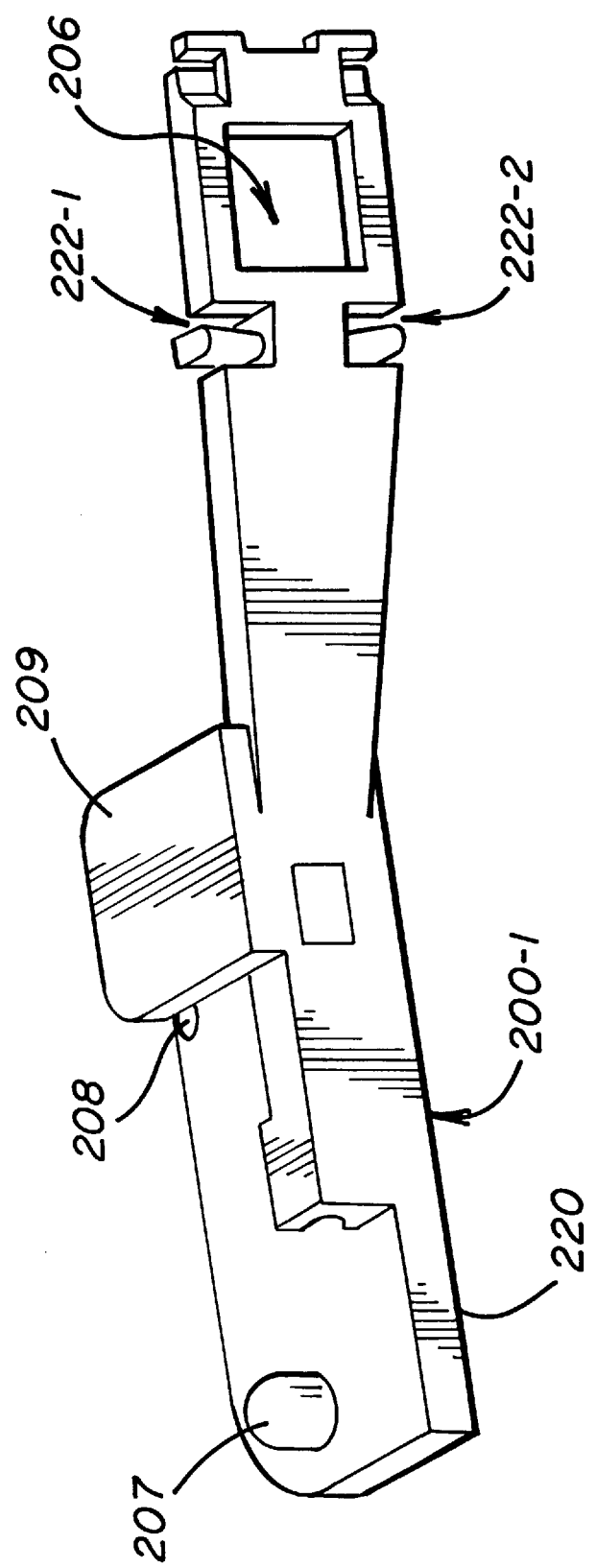
FIG. 11 is a first perspective view of the first embodiment of the wire carrier.

FIGS. 6A, 6B and 6C illustrate fabrication of actuator arm assembly 53-1. The elements of actuator arm assembly 53-1 on a precision arbor 414 provided on a base member such as a pallet 412. Each head/arm assembly 56, spacers 84, 91 and spacer yoke 86 is stacked in the arrangement shown in FIGS. 3 or 5 on the arbor. Head/arm assemblies 56a-1, 56b-1, 56c-1 and 56d-1 are stacked out-of-alignment so that heads 60a–60d do not have the opportunity to contact each other and cause damage to the head or the head/arm assembly. It should be noted that bores 114, and notches 115 will not be aligned at this point. Build comb 117 is then inserted between the head/arm assemblies 56a-1 and 56b-1, and 56c-1 and 56d-1 to prevent heads 60a, 60b, and 60c, 60d, respectively, from coming into contact with each other and thus being damaged. After the head/arm assemblies 56a-1 through 56d-1 are stacked in the out of alignment arrangement shown in FIG. 6A, comb 117 is moved to a position closer to heads 60a–d to ensure that heads 60a–d do not come into contact with each other. Head/arm assemblies 56a-1–56d-1 are then rotated into a position shown in FIG. 6B where heads 60 form a vertically aligned stack. Finally, fasteners 118a–b and nuts 119a–b are secured in bores 114 and notches 115 to retain head/arm assemblies 56a-1 through 56d-1. Optimally, as shown in FIG. 6C, fasteners 118a–b have been previously loaded into nests in pallet 412, and are pneumatically driven through arm assembly 53 from the bottom toward the top of the assembly. Nuts 119a–b are installed from above to secure bores 114 and notches 110 to retain head/arm assemblies 56a-1 through 56d-1.

Where head/arm assemblies 56-1 are provided from an outside source vendor, such vendor welds each of load beams 82 to a corresponding arm plate 59, and attaches the head 60 to a flexure on the load beams. Each head/arm assembly 56 is manufactured within tolerance specifications provided by the disk drive manufacturer. These specifications can include the following: gram load, pitch, static attitude, head gap, tensile strength of the load beam, and head size. However, in the event that such tolerances are not met, the manufacturer has the opportunity to test the head/arm assembly prior to its incorporation in the actuator arm assembly. This allows the manufacturer to achieve a flying height for the heads which varies within a range of ±0.75-$\mu$", as opposed to the 1–2$\mu$" variance currently anticipated. It should be noted that the orientation of load beams 82 with respect to arm plates 56 alternate between upper leaf facing sliders 82b, 82d and downwardly facing sliders 82a,82c, as shown in FIG. 4B. It should be noted that each arm plate 59, in the embodiment shown in FIG. 3, must have the same orientation in order for leaf spring 63 to engage shaft 111.

Fabrication of the first embodiment of actuator assembly 52, utilizing actuator arm assembly 53, is similar to the method for assembling the second embodiment of the actuator assembly, described above. Again, a pallet having a precision arbor is used as the assembly surface. The assembly process will be described with reference to the relative positioning of the spacers/yoke 86 and spacer 84 shown in FIGS. 2 and 3.

Head/arm assembly 56d is first placed onto the arbor 414. Thereafter, the yoke/spacer 86 is slid over arbor 414. Yoke/spacer 86 includes plate 116 which serves as a mounting surface for the portion of flex circuit 160 which will couple the drive electronics to electrically conductive read/write head lead wires. In the preferred embodiment of the assembly method of the disk drive, the actuator flex circuit will be pre-attached to plate 116 by a suitable method such as the use of adhesives, a non-adhesive fastener, or welding. In addition, coil 85 will be attached to yoke/spacer 86, and the ends of coil 85 will be electrically coupled to the flex circuit 160 by, for example, soldering the coil wires to terminal pads on the flexible circuit. Pre-amp chip 170 is also attached to flex circuit 160 prior to attachment of flex circuit 160 to plate 116. Again, the attachment of the actuator flexible circuit 166 to plate 116 may be performed by the outside vendor. Again, the specifications of flexible circuit 160 and the manner in which it is attached to mounting plate 116 will be specified by the disk drive manufacturer. Flex circuit 160 is preferably attached prior to assembly of actuator arm assembly 53, and second end 160b of flex circuit 160, which is not attached to plate 116 and which will be coupled to header assembly 54, is held out of contact with head/arm assemblies 56 during the actuator arm assembly process.

Subsequently, head/arm assembly 56c will be placed on top of yoke/spacer 86. It will be noted at this point that leaf springs 63a–63d, notches 112, and shaft 111 are not in engagement when the head/arm assemblies are placed onto the arbor. Thus, shaft 111 is held at a position which is clockwise rotated with respect to leaf spring 63 on each of the head/arm assemblies. Further, head/arm assembly 56c is rotated with respect to actuator arm assembly 56d to avoid contact between heads 60d and 60c. Because the head/arm assemblies are placed in the arbor at different positions, the distance between each notch on springs 63a–63d and shaft 111 will vary. After assembly 56c is mounted on arbor 414, spacer 91, head/arm assembly 56b, spacer 84, and head/arm assembly 56a are sequentially provided on the arbor.

As with the assembly process shown in FIG. 6A, a build comb 117 is thereafter placed into the gaps between arms 82a and 82b, and arms 82c and 82d, respectively. Subsequently, head/arm assemblies 56 are rotated into a position where heads 60a–d are in vertical alignment along an axis A as shown in FIG. 6B. When heads 60a–60d rotate into alignment, leaf springs 63a–d rotate clockwise with respect to spacer/yoke 86, which is held stationary, with a force sufficient to allow bevel edge 113 to bend leaf spring 63 toward arm 59 until notch 112 engages shaft 111. The head/arm assemblies will thus be secured against rotation relative to each other and spacer/yoke 86. Once clamped by actuator bearing cartridge 90 and lock ring 123, arm assembly 53 is secured. A load or shipping comb is then positioned at the front end of the stack and remains there while actuator assembly 52 proceeds to installation of bearing cartridge 90.

After the actuator arm assembly 53 is completed, bearing cartridge 90 may be installed. Installation of the bearing cartridge is generally performed manually by inserting the bearing cartridge through bore 108, and attaching spacer 123 and clip ring 124. During this process, the comb remains separating the heads so that no damage to the heads results during handling.

In an alternative bearing cartridge design, lip 103 may be provided at the base of bearing cartridge 90, with lock ring 123 at the top. In this embodiment, outer member 102 is essentially reversed from top to bottom and may be secured on the base plate prior to installation in the actuator arm assembly. This alternative advantageously allows for the actuator assembly to be assembled directly on base plate 42 of the drive. In such case, actuator post 64 would be attached in base 42, and bearing cartridge 90, in the inverted embodiment previously described, mounted thereon. Thereafter, the head-arm assemblies, spacer and spacer/yoke are placed over the bearing cartridge. The assembly can then be rotated and secured in accordance with the first or second embodiment of actuator arm assembly 53.

Head Wire Carrier

FIGS. 7–16 show various embodiments of a head wire carrier suitable for use in accordance with the assembly of the actuator and the disk drive of the present invention.

FIG. 7 is a perspective view of a first embodiment of the head wire carrier 200. FIG. 7 shows a first end portion of flex circuit 160 attached to flex circuit bracket 116 of spacer/yoke 86. A single actuator arm 59 is shown abutting spacer/yoke 86; for simplicity, load beam 82 and head 60 are not shown. FIGS. 8A–8C are side, top, and sectional views of the first embodiment wire carrier 200.

Wire carrier 200 attaches to actuator arm 59 by means of molded tabs 201, 202, 203, and allows for accurate positioning of head lead wires 210 and 212 over solder pads 262, 264 of flex circuit 160. Head lead wires 210 and 212 are coupled to head 60 to carry data read/write signals to and from head 60.

Lead wires 210,212 are encased in a 0.012 inch diameter Teflon tube insulation 211; the insulation ends where the leads are exposed to make electrical contact with termination pads. Prelocating of the head lead wires over the solder pads of the circuit 160 allows for the use of an automated reflow soldering processes to couple the head lead wires to the flex circuit leads. This can result in considerable cost savings to the drive manufacturer as well as an increase in the speed of the process for manufacturing disk drives. In prior art manufacturing processes, assembly of the head wire leads to the flexible circuit would require manual soldering of the head wire pairs to respective solder pads. This means that a human worker would be required to manually align each wire lead and solder the lead to the head pad. The placement of head wire carrier 200 on each arm 59 effectively eliminates the human element at this stage of manufacturing process of the actuator. As will be explained in further detail below with respect to additional embodiments, head wire carrier 200 has an extended position and a retracted position. The retracted position is shown in FIGS. 7 and 8. In the retracted position, window 206 of wire carrier 200 is closely adjacent to arm plate 59 and the head lead wires 210, 212, are positioned adjacent to flex circuit 160 and therefore may be attached thereto by use of reflow soldering. A soldering device suitable for this purpose is the HTT1000, manufactured by Hughes Aircraft Corp. In an extended position, as shown by a first alternative embodiment 200-1 in FIG. 10), window portion 206 of head wire carrier 200 rotates about the axis defined by tabs 201 and 202 (or, in embodiments 200-1, 200-2, about lock pin 207, in a clockwise position relative to FIG. 8B) to allow head arm assembly 56 to be assembled into actuator assembly 52 without interfering with the position of actuator flex circuit 160 mounted to plate 116 of yoke/spacer 86.

Figure 12:
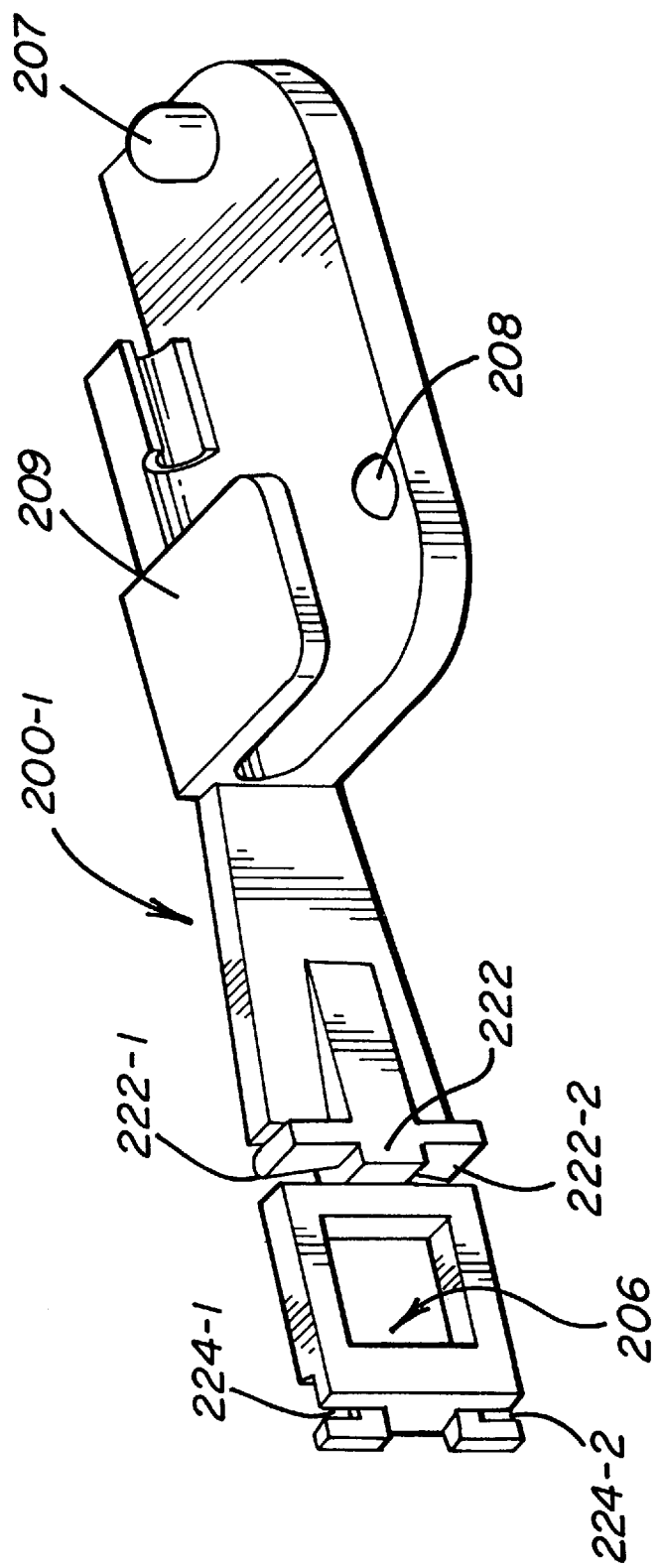
FIG. 12 is a second perspective view of the first embodiment of the wire carrier.
Figure 12A:
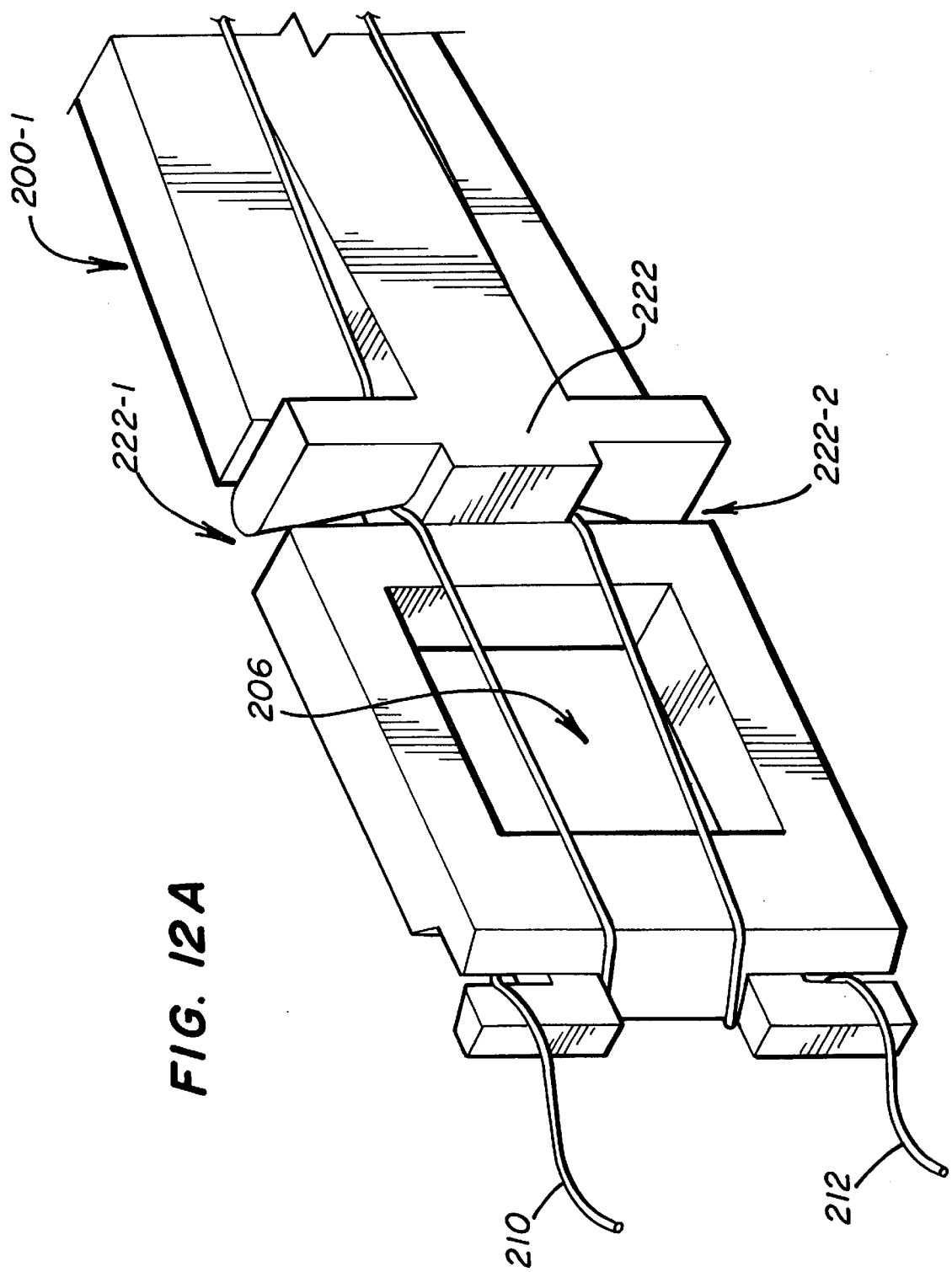
FIG. 12A is an exploded view of a portion of the first embodiment of the wire carrier.
Figure 13:
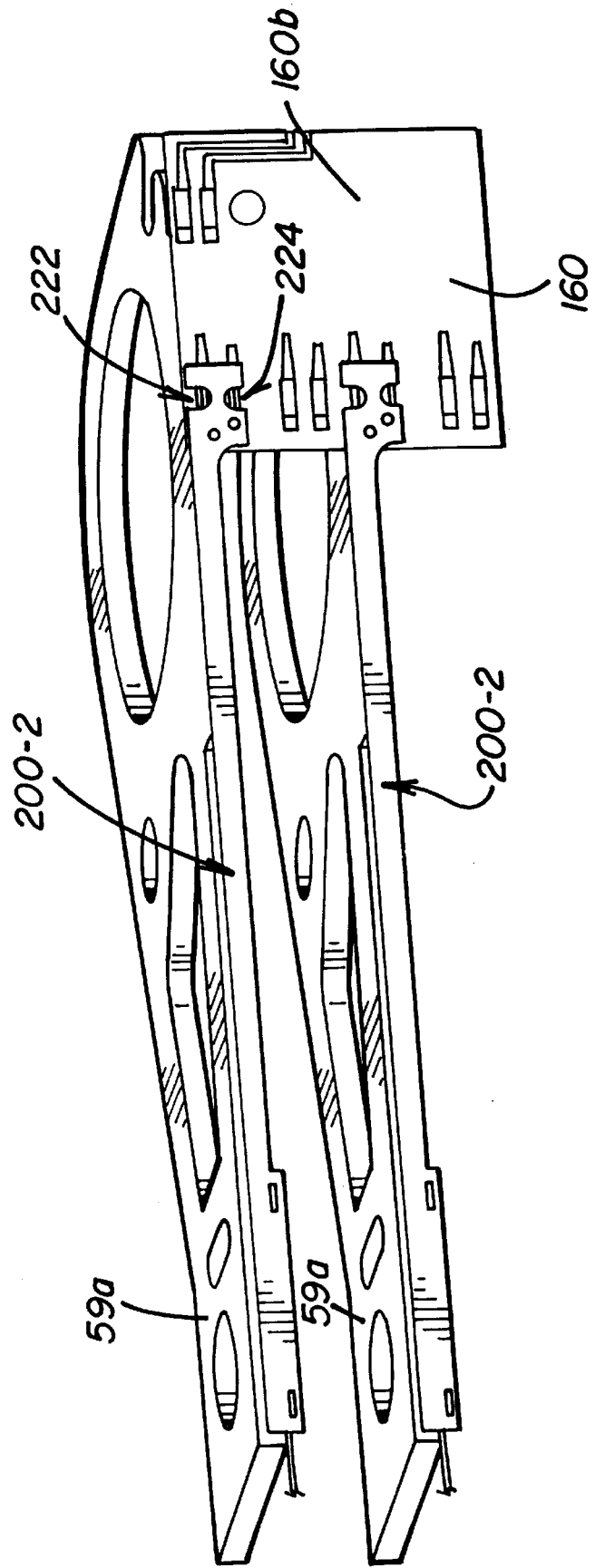
FIG. 13 is a perspective view of a second embodiment of a wire carrier in accordance with the present invention.

FIGS. 9, 10, 11, and 12 illustrate perspective views of a second embodiment of head wire carrier 200-1 attached to arm plate 59. It should be recognized that the orientation of head wire carrier 90 relative to arm plate 59 can be reversed so that head wire carrier 200 or 200-1 can be utilized on either side of arm plate 59 depending on the design requirements of the storage device. Head wire carrier 200-1 includes a lock/tab 208 and pin 207 which secure head wire carrier 200 between upper shelf 209 and plate 220. In the retracted position, shown in FIG. 9, each wire carrier 200-1 is secured to each arm plate 59 by a lock tab 208 which engages surface 57 of arm plate 59. In the extended position, shown in FIG. 10, pin 207 remains secured in arm plate 59 and carrier 200-1 is rotated about pin 207 to allow flex circuit 160 and mount plate 116 to be inserted between window 206 and arm plate 59. As shown in FIG. 12, a wire mount member 222 is positioned on one side of wire carrier 200-1 to allow routing of head lead wires, such as wires 210 and 212, in the notches formed at ends 222-1, 222-2, and through slots 224-1 and 224-2, to precisely locate and secure the respective head lead wires in window 206.

Figure 14:
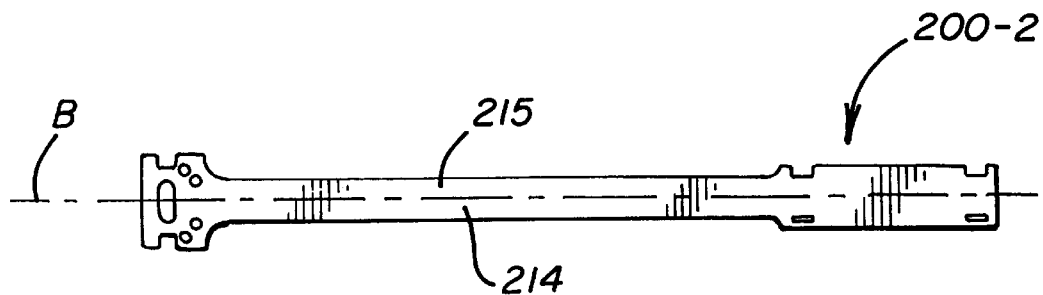
FIG. 14 is a planar view of a second embodiment of a wire carrier in accordance with the present invention.
Figure 15:
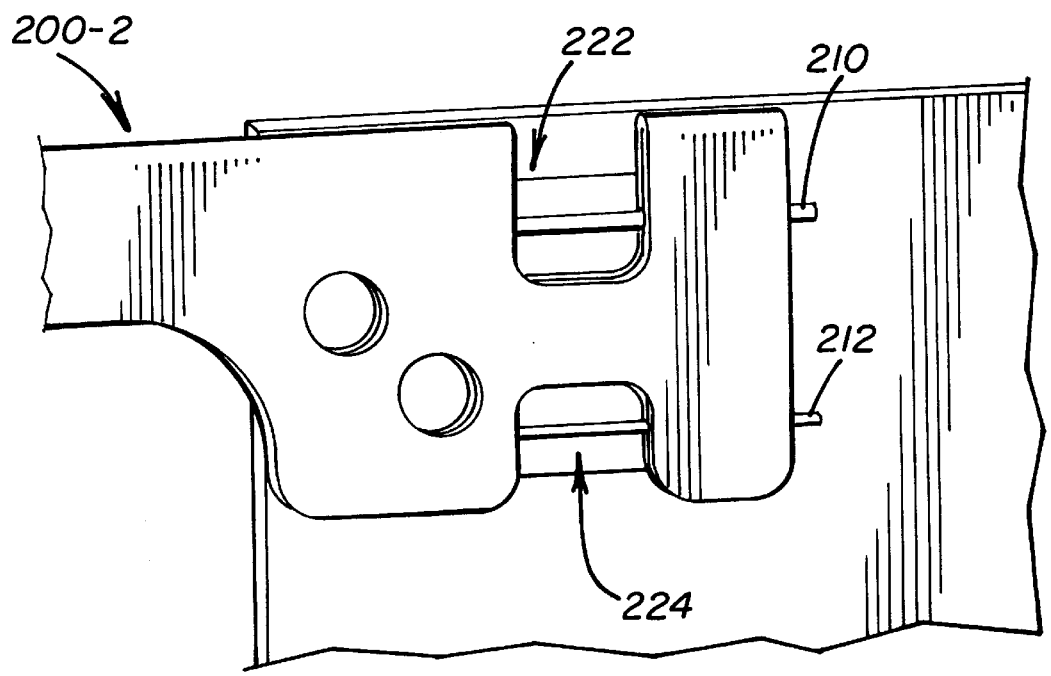
FIG. 15 is an enlarged perspective view of one end of a second embodiment of a wire carrier in accordance with the present invention.

FIGS. 13–16 show another alternative embodiment of a wire carrier 200-2 which comprises a flexible strip retainer, having two window regions 222 and 224 to pre-locate head lead wires 210 and 212 over solder pads 262, 264. As shown in FIG. 14, wire carrier 200-2 is fabricated so as to be folded across a fold line B in FIG. 14 so that the head wire pairs, such head wires 210, 212, are contained between sides 214,215 at the interior of the folded member. The folded member is then secured to arm 59 or by an adhesive or other means.

The wire carrier of the present invention provides the distinct advantages of facilitating the use of reflow solder and a completely automated actuator and drive assembly process. In addition, wire carrier 200 also allows for the use of a solderless coupling between the head lead wires and the flex circuit which greatly reduces the amount of contamination in the drive and improves the ease with which both the actuator assembly and the drive as a whole can be assembled.

Figure 16A:
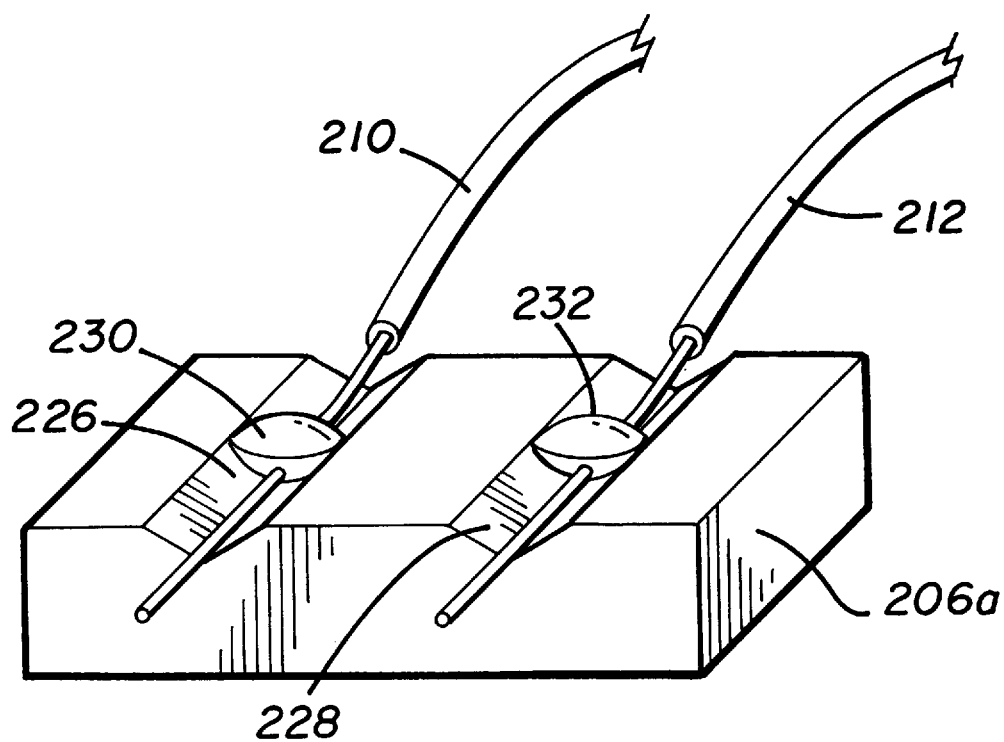
FIG. 16A is a perspective view of a first embodiment of a solderless wire coupling fixture suitable for use with the wire carrier of the first embodiment of the present invention.

FIG. 16A shows a first embodiment of a solderless wire coupling in accordance with the present invention. Shown therein is an adapter block 206a which may be inserted into window 206 of wire carrier 200 or 200-1. In this embodiment, lead wires 210 and 212 are placed in channels 226 and 228. A drop of conductive electrical gel 230, 232, which may comprise a conductive silicone polymer connector such as that manufactured by Amp Electronics, is suitable for use in this embodiment. Optionally, a corresponding drop of gel can be placed opposite a modified flex circuit. The conductive gel is potted into cups (not shown) in the carrier, the cups having a half-spherical shape and sized to receive drops 230, 232. The gel is placed in the cups, around the wire ends, and then cured. Alternatively, the wire ends are laid over the conductor gel after curing as in FIG. 16A. Block 206a is then placed in wire carrier 200-1 and the carrier attached to arm plate 59. Preferably, head lead wires 210 and 212 secured in grooves 226, 228 with drops 230, 232 conductive gel applied thereto and provided to the disk drive manufacturer by the head arm assembly outsource manufacturer. After block 206a is placed in wire carrier 200 or 200-1, the assembly of the actuator arm assembly 53 proceeds in accordance with the above description. Once the actuator arm assembly 53 is secured, each carrier 200-1 and the wire leads with conductive gel 230, 232 is pressed against flex circuit solder pads 262, 264. The solderless coupling assembly facilitates automation of this final manufacturing step as head lead wires 210,212 and flex circuit pads 262,264 are pre-located in alignment by the head wire carrier 200, without the use of contaminant elements in the attachment process. Of particular concern with this embodiment of the solderless coupling where a conductive gel is used are the electrical characteristics, and the outgassing qualities of the conductor gel. Care must be taken to ensure that the selection of a conductive gel is one which does not provide additional contaminants into the drive at unacceptable levels over the life of the drive.

Figure 16B:
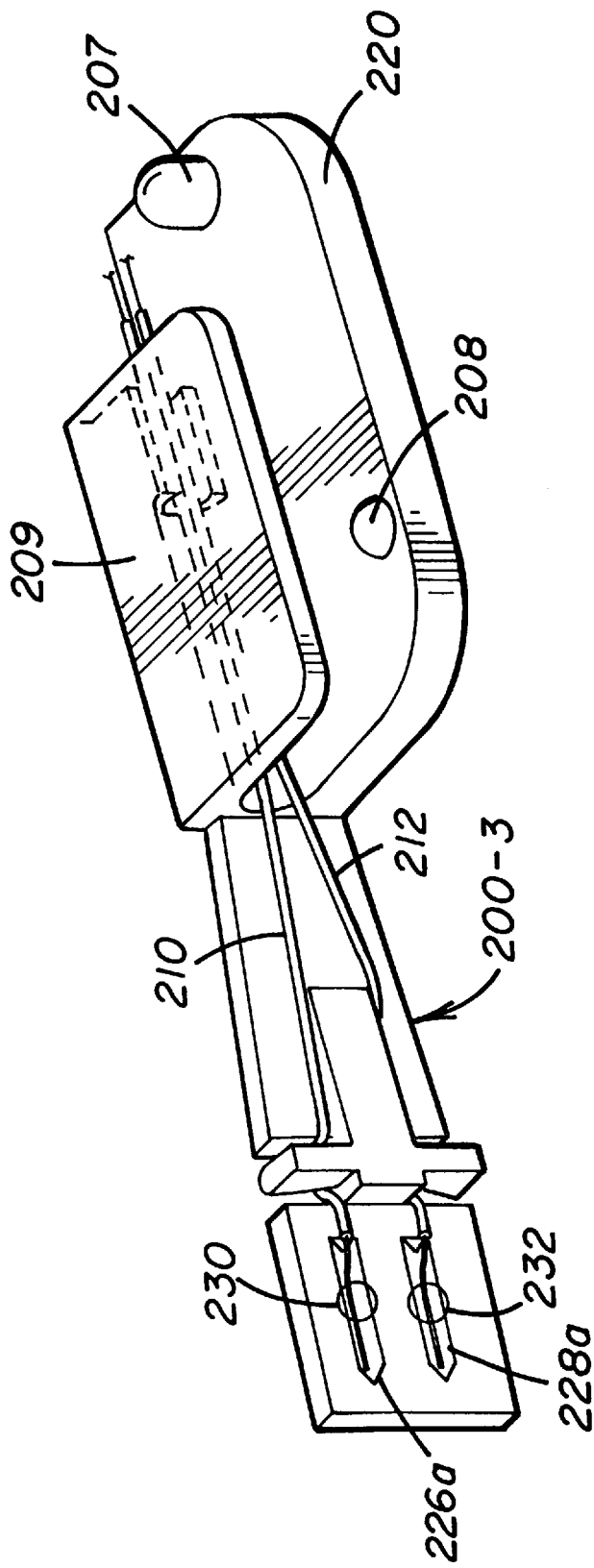
FIG. 16B is a perspective view of a wire carrier utilizing the first embodiment of the solderless coupling with the first or second embodiments of the wire carrier of the present invention.

A second alternative manner for using the solderless, conductive gel to couple the head lead wires to the flex circuit is shown in FIG. 16B wherein a third embodiment of wire carrier 300-3 includes grooves 226a, 228a formed directly into carrier 200-3, and conductive gel 230,232 applied directly thereto.

Another embodiment of a solderless wire coupling assembly suitable for use with the wire carrier of the present invention is shown in FIGS. 17A, and 17B. FIG. 17A is a side view and FIG. 17B a top view of a plug-in connector 240, including conductor pins 242 and 244, which are coupled to head lead wires 210 and 212, respectively. The pins are mounted to a bracket 248 which can be secured to arm plate 59 by placing the square receptacles 252 and 254 in bracket 248, and mounting fingers 249 and 250 through receptacles 252 and 254. As shown in FIG. 17B, flex circuit 160 is provided with through holes 266,268, and flex lead pads 270,272. Lead pads 270,272 are electrically coupled to pins 242,244, and hence wires 210,212, by surface mount solder tabs 274 and 276 coupled to sockets 275 and 277, respectively, on socket housing 246. Socket housing 246 is preferably adapted to be secured to one of the aforementioned embodiments of the wire carrier. When the assembly is fitted together, flex circuit 160 is sandwiched between housing 246 and arm plate 59, bringing pads 270,272, tabs 276,274, and pins 242,244 into engagement, thereby electrically coupling wires 210,212 to flex circuit 160.

Figure 18D:
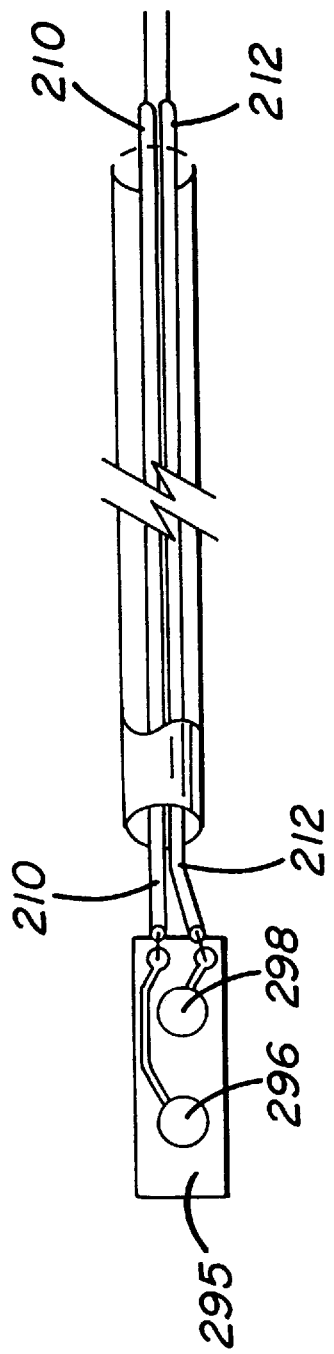
FIG. 18D is a detailed view of the head lead wire termination and flexible tab suitable for use with the second embodiment of the wire carrier of the present invention.

FIGS. 18A and 18B are top and side views, respectively, of another embodiment of a solderless lead connector suitable for use in accordance with the wire carrier of the present invention. As shown therein, a side rail 290 is provided on arm 59. Side rail 290 is bent to form a right angle with respect to the major surface portion of arm plate 59. Head arm wires 210,212 are coupled to a flex tab assembly 295 which includes terminal pads 296 and 298. Flexible tab 295 can be adhered to rail 290 by the use of pressure sensitive adhesive backing material, such as part no. Y966, manufactured by the Minnesota Mining and Manufacturing Corporation (3M). Details of flexible pad 292 are shown in FIG. 18D. Flexible pad 292 is comprised of polyamide flexible printed circuit pad, with contacts 296,298 comprising copper pads provided less than 0.0005 thick gold plating.

A contact carrier subassembly 300 includes two snap-in fasteners 302 and 304 which secure contact carrier 300 to flexible circuit 160. In this embodiment, flexible circuit 160 is provided with three contact pads 306, 307, and 308 which electrically couple wires 210,212 provided in flexible circuit 160 to corresponding contacts 309, 310, 311 on contact carrier 300. A backing stiffener 310 is provided to secure flex circuit 160 to contact carrier 300. Contact carrier 300 also includes contact pins 312, 314, and 316. Contacts 314,316 engage pads 296 and 298, as shown in FIG. 18C. Pads 309, 310, 311, 314, and 316, are microconnectors such as those manufactured by the Cinch Company and marketed under the name "CIN::APSE" Button Contact Carrier. As shown in FIG. 18C, the contact carrier 300 is secured through holes 318,320 in flex circuit 164 to stiffener 310 forming the contact carrier subassembly. This subassembly can then be secured to bore 292 by contact 312 flexible tab 290 coupled to head lead wires 210,212. The contact and retention of the contact carrier subassembly with pads 296,298 is assured through the adhesive forces of the button contact connectors.

Once the carrier subassembly is formed, as shown in FIG. 18C, the contact carrier 300 is secured to arm 59, and specifically rail 290, by compressing contact 312, 314, 316 against contacts bore 292, on rail 290, and pads 296,298 on flex tab 295. It should be readily recognized that stiffener 310 may comprise a portion of the wire carrier 200,200-1, in accordance with the teachings set forth above.

FIGS. 19A and 19B show yet another alternative embodiment of solderless electrical connectors fused with the wire carrier of the present invention. FIG. 19A is a side view of the head arm and flex tab, while FIG. 19B is a top view of the coupling assembly. Contact carrier 330 includes two contact buttons 332 and 334 similar to those represented with respect to contact carrier 300. A ground connector 336 is also provided with a pointed end 337 which will engage through hole 292 in tab 290. Flexible tab 295 are equivalent to that shown and described with respect to FIG. 18, arm tab 290, and bores 294,295. Flexible circuit 160, in this embodiment, is provided with compression connectors 340, 342 and 344 which engage contacts 333, 335 and 337 on contact carrier 330. A backing stiffener 350, which may again comprise a portion of the head wire carrier 200, 200-1, is adhesively secured to the flex circuit 160. In assembly, stiffener 350 is forcibly applied against the contact carrier pads, ground pin 336 engages through bore 297 and secures contact carrier 330 against flex pad 295 so that contacts 334 and 332 engage lead wires 210,212. Compression contact connectors 340, 342 and 344 engage contacts 333, 335, and 337, thereby securing the flex circuit against the contact carrier and forming an electrical connection between the head lead wires and the flexible circuit.

FIGS. 20A and 20B show two variations of a fourth embodiment of a solderless contact carrier in accordance with the present invention. FIG. 20A is an exploded view and FIG. 20B an assembled view of the solderless assembly. Flex circuit 160 in this embodiment, is mounted to a receiving member 360 which includes tabs 362 and 364. As noted in FIG. 20A, receiving member may be one of two lengths—the long version of member 360 is reflected by solid tab 362 on arm 361, and dashed tab 364-1 on arm 363-1. Compression connectors 366,368 are provided on flex circuit 164. Head wire carrier 370 includes two wire pins 372,374 which may be pre-soldered to head lead wires 210 and 212. Main block 380 includes detents 381,382 which engage tabs 362,364. Arm 59 includes two lock arms 376,378, which engage wire holder 370 to secure carrier 370 against arm plate 59.

An alternative embodiment of carrier 370 includes detent regions 381-1, 382-2 on arms 384,386 formed onto the side of main body portion 380 of the carrier. In this embodiment, the "short" version of member 360 is used and tabs 362 and 364 align with regions 381 and 382 and form a snap fit. Arms 384,386 align with inserts 388,390 in arm plate 59. The assembled head arm contact assembly is shown in FIG. 20B, with the first, short alternative embodiments shown in solid form on the right side of the figure, and the second, long version shown on the left side of the figure and in dashed form on the right side of the assembly.

Figure 21A:
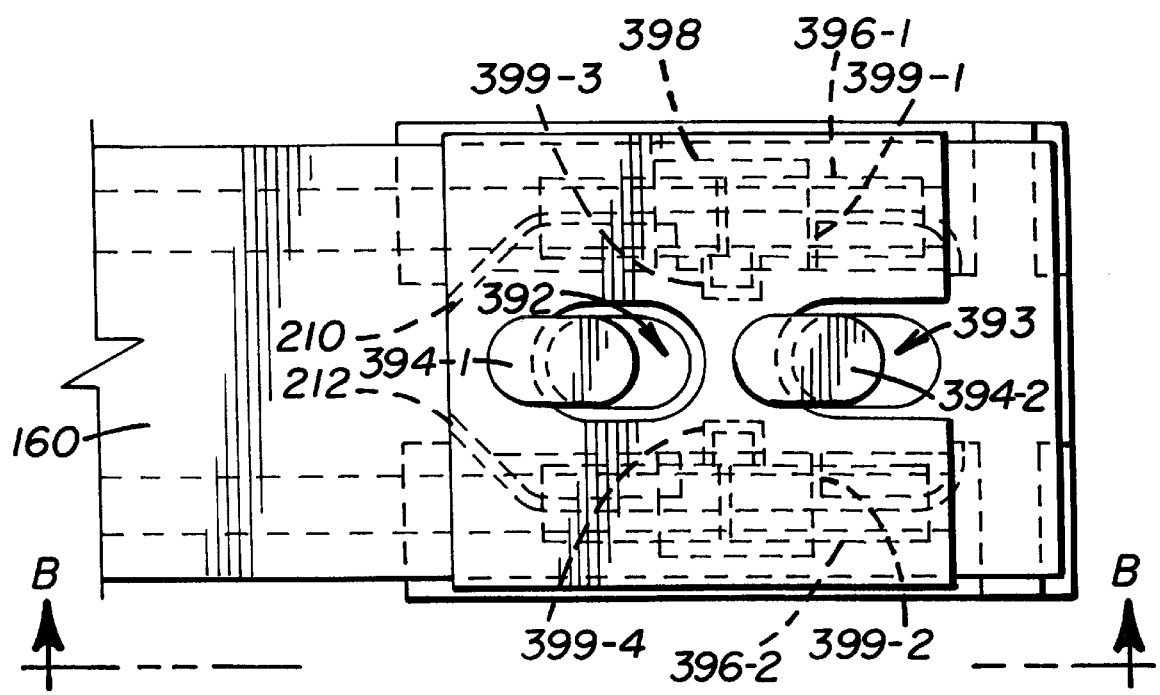
FIGS. 21A and 21B are top and side views, respectively, of another embodiment of a solderless wire coupling assembly.
Figure 21B:
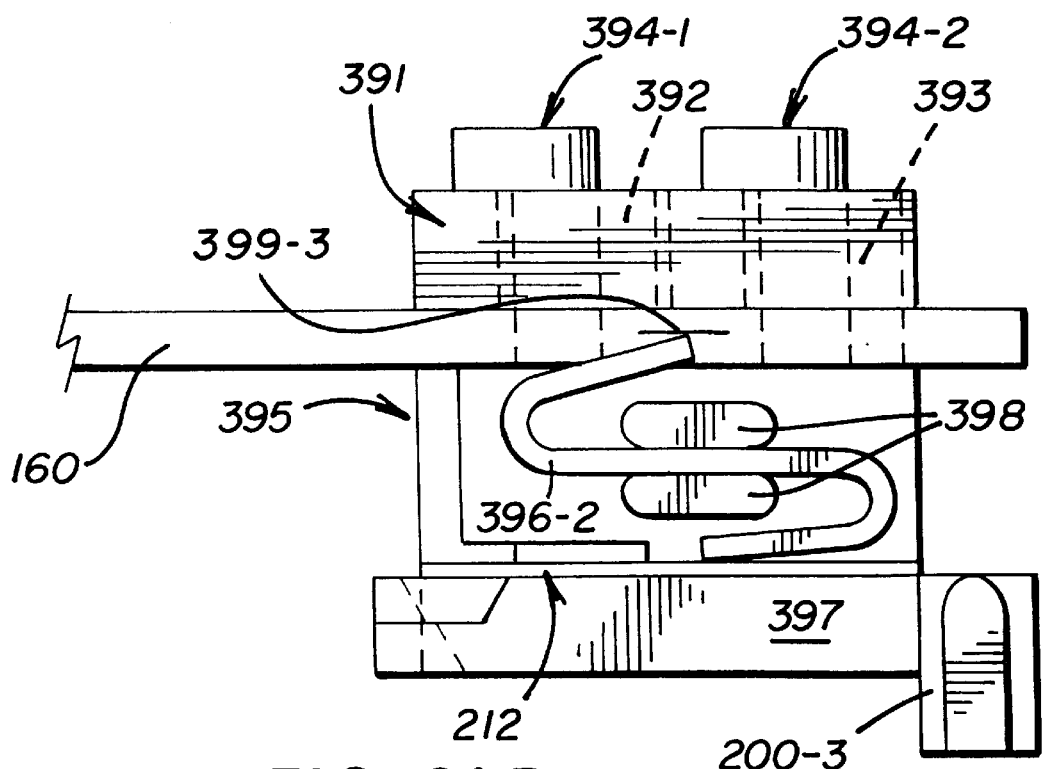

FIGS. 21A and 21B are a side view and top view, respectively, of another alternative of a solderless wire coupling suitable for use with the wire carrier of the present invention. Flex circuit 160 has a cover 391 attached thereto which is attached to arm assembly 56. Cover 391 includes through bores 392 and 393 which are adapted to receive locking posts 394-1, and 394-2. Locking post 394-1 and 394-2 are coupled to a spring connector assembly 395 which includes two spring connectors 396-1 and 396-2 and contact retainer 398. Head wires 210 and 212 are coupled to a support member 397 and secured to head wire carrier 200-3. Each wire 210, and 212 is adapted to have a wire interface pad 399-1, and 399-2 which is preferably plated with gold and which interfaces with a first side of spring connectors 396-1, 396-2. Flex circuit 160 engages another one side of contacts 396-1, 396-2 at points 399-1, 399-2. Lock post 394-1 and 394-2 are provided through bores 392 and 393 so that the upper portion of each post 394-1 and 394-2 passes through bores 392 and 393 and are shifted to the left, in the orientation shown in FIG. 21b, to lock cover 391 to assembly 395. This will allow s-contacts 396-1 and 396-2 to engage the wire interfaces 399-1, and 399-2 and flex interfaces 393 and 394. FIG. 21B shows an embodiment where the terminal pads of flex circuit 160 are arranged to connect to the opposite side of the circuit from their orientation shown in previous embodiments. The circuit traces are generally oriented on the top portion of the circuit, as shown in FIG. 21B, and circuit 160 must be adapted to engage spring connectors 396-1, 396-2.

Figure 21C:
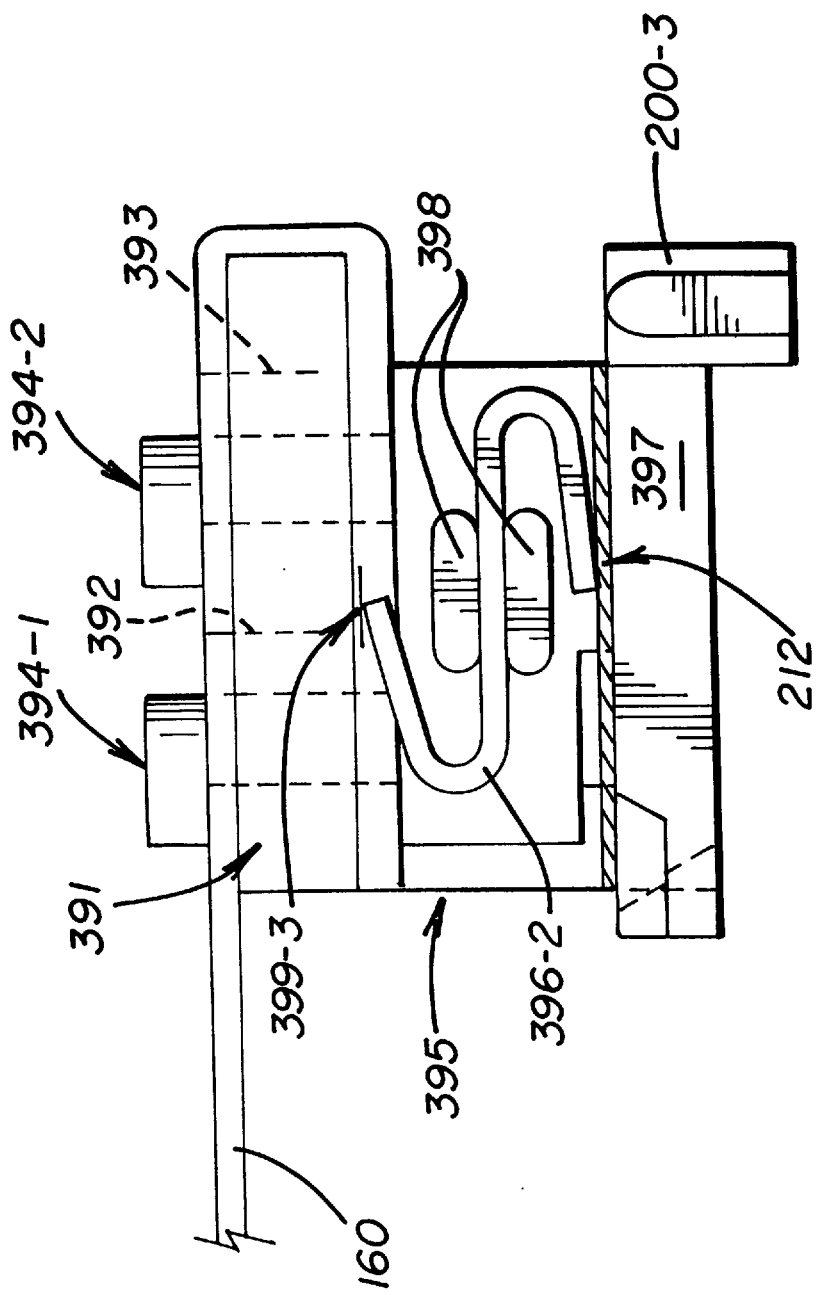
FIG. 21C is a side view of a second alternative embodiment to the coupling shown in FIGS. 21A and 21B.

An alternative cover 391a is shown in FIG. 21C wherein flex circuit 160 wraps around cover 391a, with additional through bores provided in flex circuit 160 at locations corresponding to through bores 392, 393. This allows the flex circuit conductive wires to be oriented correctly with respect to the terminal pads on the flex circuit 160 as shown in previous embodiments.

It should be readily recognized that any number of suitable soldered or solderless type connector assemblies may be prepared in accordance with the teachings of the present invention. The wire carrier of the present invention provides an automated solution to the problem of attaching the head arm lead wires 210,212 to the solder pads or other suitable connector on the flex circuit.

Actuator And Disk Drive Assembly

The aforementioned features of the architecture of the disk drive for the present invention allow for an automated assembly process to be utilized to assemble the components of the disk drive. Using an automated assembly process reduces the contamination, human error, and therefore increases the drive production yield which can be attributable to manufacturing the disk drive in accordance with the method.

Figure 22:
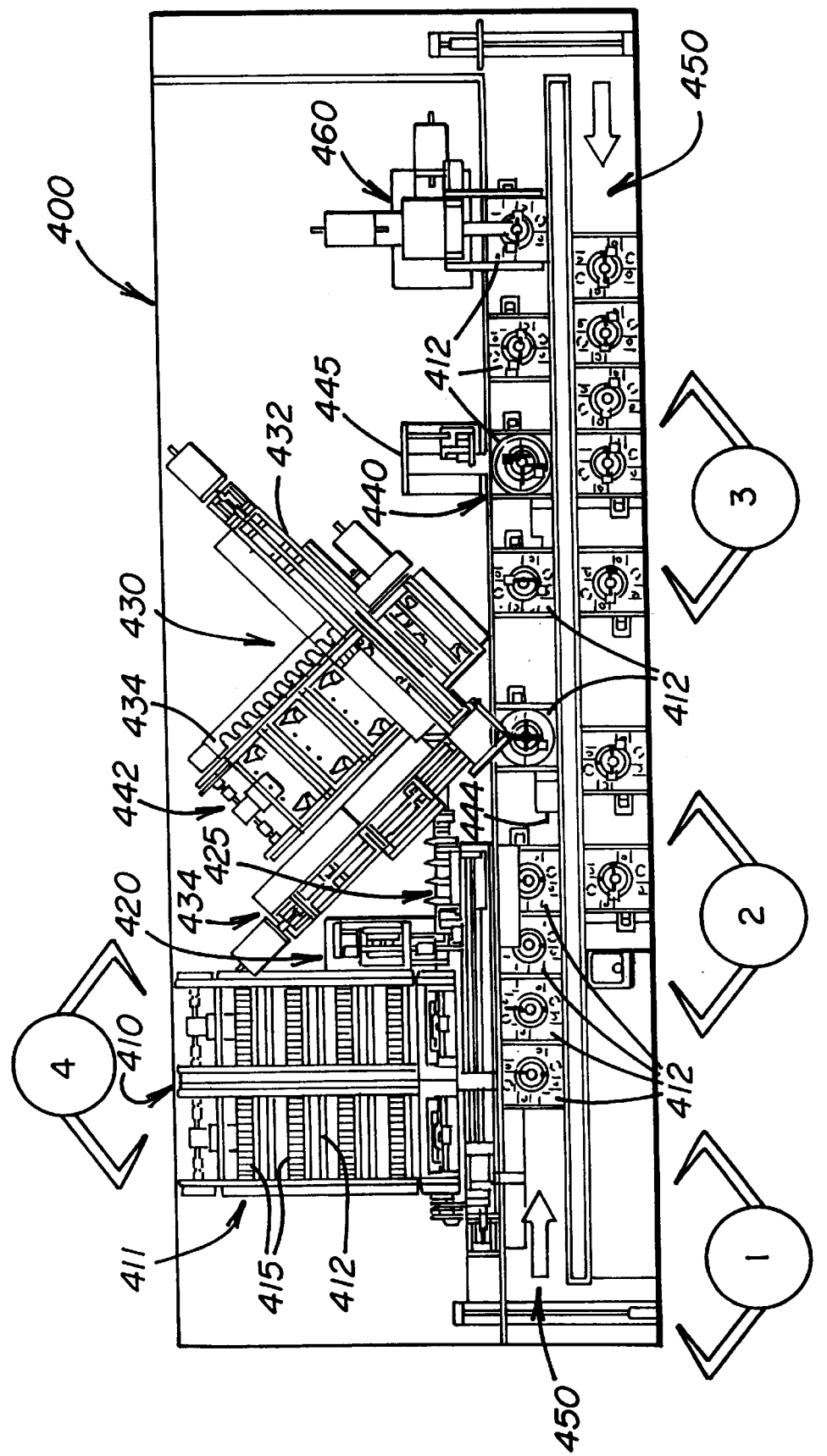
FIG. 22 is a plan view of an apparatus suitable for implementing the assembly process of the disk drive in accordance with the present invention.

FIG. 22 is an overview of an apparatus for assembling actuators incorporating actuator assembly 52 and various embodiments of the head wire carrier 200 described above. In the embodiment shown in FIG. 22, the method is shown as a partially manual process including operations for four individuals indicated by reference numbers 1–4 at particular stages in the assembly process. It should be recognized that the human assembly element could be removed by automation.

Apparatus 400 includes part stacking conveyor 410 which is serviced by an individual shown at reference number 4. Individual number 4 places trays 415 of pre-manufactured head/arm assemblies 56 in a part stack 411 on conveyor 412 adjacent to drive line 450. A tester 420 is provided to pre-test all of the head/arm assemblies 56 which are to be installed in the disk drives. This tester determines whether the characteristics of gram load, head continuity, and static attitude (head pitch and roll) of each of the head/arm assemblies meet the design specification of the manufacturer to within acceptable tolerances. By testing all of the aforementioned factors of each of the head/arm assemblies prior to installation of the head/arm assemblies in the drives, increased accuracy in the flying height at the head disk interface and improved production yields can be achieved, since parts which do not meet the design specifications of the disk drive manufacturer are rejected prior to assembly into the actuator stack. A series of assembly pallets 412 is utilized to manufacture each of actuator assemblies 52. In the embodiment shown in FIG. 22, pallets 412 are flat blocks of aluminum or acetal plastic with precision arbor 414 provided at the approximate center of the pallet. The pallets are passed along a conveyor line 450, for example, a Shuttleworth, "Slip-Torque" conveyor, from station to station.

Three automated assembly stations 430, 440, and 460 are provided. The automated assembly stations comprise stacking station 430, arm and coil rotation and fastener station 440, and solder station 460.

A particular pallet 412 is initially carried to stacking station 430 on conveyor line 450. Head/arm assemblies 56/56-1 are carried by presenter 425 to an automated head/arm manipulator 434. Head/arm assembly manipulator 434 positions the head/arm assemblies 56 on arbor 414 at station 430 in the out of alignment arrangement described in accordance with the method for assembling the actuator 52 structure described above. A second manipulator, coil/spacer manipulator 432, places spacers/yoke 86, with coil 85 attached, and spacers 84 on arbor 414. Manipulators 434, 432 may be comprised of commercially available robotic components from THK America (linear motion actuators), Pacific Scientific (servo motors and amplifiers) and Motion Engineering, Inc. (servo controller system), with a programmable control system adapted to perform the desired stacking procedures. Conveyor 442 is positioned below manipulator 432 to provide the assembly comprising spacer/yoke 86 and coil 85 to manipulator 432. It should be noted that flex circuit 160 is attached to plate 116 on yoke/spacer 86, coil 85 attached to yoke/spacer 86, and pre-amp chip 170 attached to end 160b of flex circuit 160. A belt conveyor 436 transfers spacers 84, 91 to manipulator 432. A lift assembly 444 is positioned under station 430 to lift pallet 412 off line 450, and rotate pallet 412 alternately clockwise and counterclockwise to allow the head/arm assemblies, coils and spacers to be stacked in the out-of-alignment arrangement. Once the parts are stacked on the pallet, the pallet advances toward the rotation and fastener station 440. Manipulator 445, provided at station 440, rotates head arm assemblies into alignment, and installs fasteners 118a–b, 119a–b in accordance with the method described above with respect to the second embodiment of the actuator assembly (FIG. 5). Alternatively, where the actuator arm assembly 53, including the leaf spring and detent arrangement described with respect to FIGS. 2 and 3 is used, the fasteners need not be provided. The shipping or load comb previously loaded to the pallet by individual number 1 remains between the respective actuator arm assemblies during the final stages of assembly to ensure the heads do not come into contact. Second end 160b of flex circuit 160 is held out of contact with the balance of the head/arm assembly so that the flex circuit 160 does not interfere with fabrication of the actuator. However, the lead portion 160a of the flex circuit assembly is coupled to mounting plate 116 on spacer/yoke 86.

Once head-arm assemblies 56 are rotated into alignment and secured with respect to spacer 84 and spacer/yoke 86, by manipulator 445, the wire carriers attached to each head/arm assembly are rotated so that the head wire pairs are adjacent to the solder pads. It should be understood that, where solderless carriers are used, this step brings the wire leads coupling assembly, mounted on the head wire carrier, into contact with the head wire assembly portion of the particular solderless assembly used on the head/arm assembly.

Each pallet carrying the now-assembled actuator arm assembly 53 thereafter advances to a solder station 460 on line 450. At station 460, manipulator 455 attaches the eight head wire leads of the four heads 60a–d, through the use of reflow solder in accordance with the method described above regarding wire carriers 200, 200-1 and 200-2. The head wires may be attached to the head wire arms to the solder pads on the flex circuit 160 without human interaction, since the wires are prelocated over the solder pads. Where solderless connectors are utilized, this step can be eliminated as noted below.

Three manual assembly stations 470, 480, 490 are then provided.

Once the soldering operation is complete, pallets 412 advance to a human individual number 3, at station 470, who takes the second end of the flexible circuit 160 and wraps the flexible circuit about actuator assembly 52. Individual number 3 also installs a strain relief to maintain the flexible circuit 160 in a position about actuator assembly 52, suitable for installation into a disk drive. Each pallet then advances to individual number 2, at station 480, where bearing cartridge 90, spacer 124, and lock ring 123 are installed. Once this is completed, the assembly moves to individual number 1, at station 490, who transfers the assembled actuator assembly to a shipping tray, or transfer mechanism (for provision to the drive assembly). This individual then loads either a shipping or a load comb into a now-empty pallet. The shipping comb is utilized if the assembly is to be substantially transferred over a great distance. A load comb is utilized where apparatus 400 is integrated directly adjacent to drive assembly process. The load comb is then used to install the actuator over the disks 48 and the disk drive 30 of the present invention.

Where apparatus 400 is utilized to assemble actuator assemblies 52 directly on a base plate and modified actuator bearing cartridge 90, the need for shipping combs is eliminated.

Figure 23:
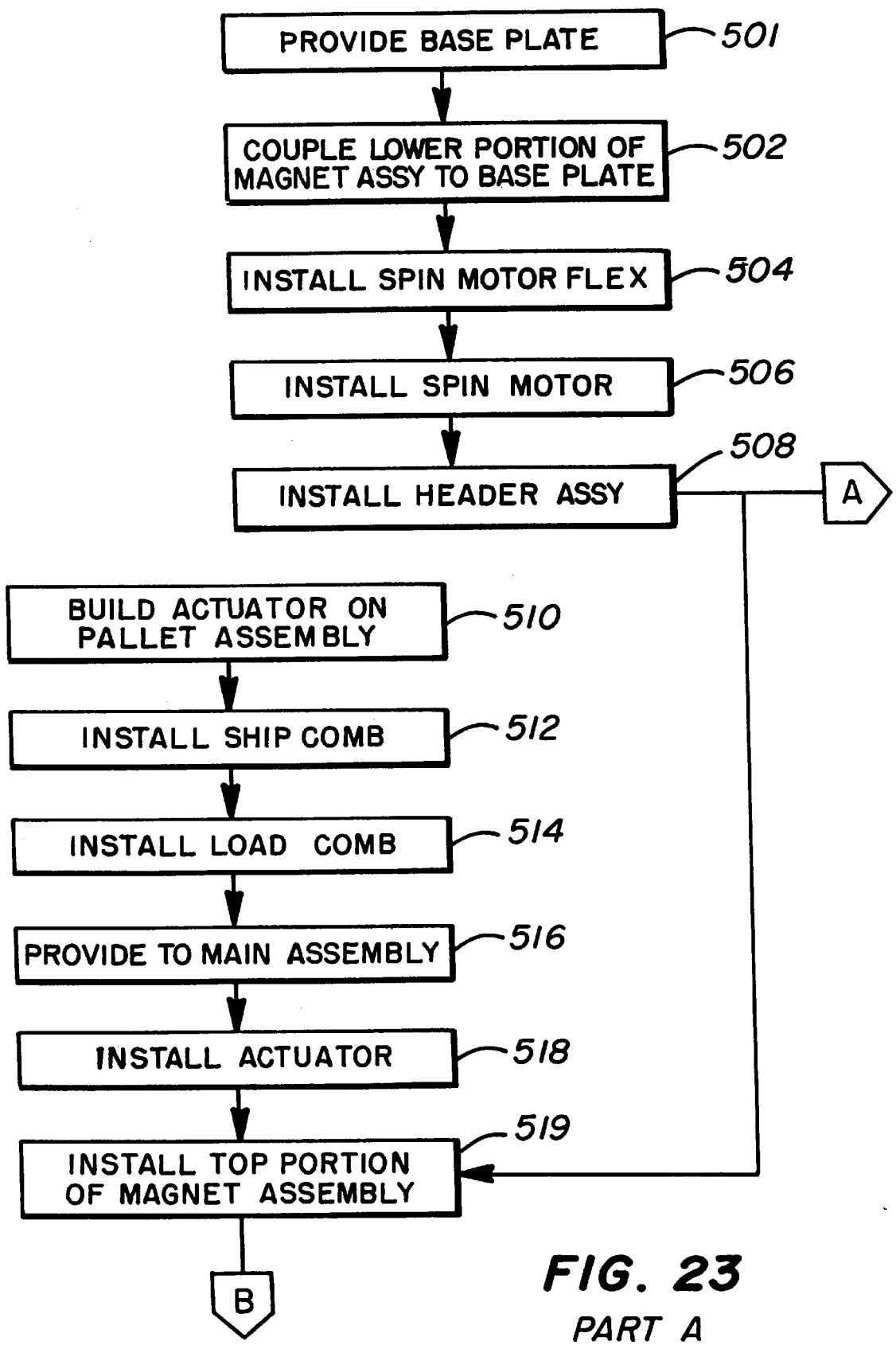
FIG. 23 is a flowchart of a process for assembling a disk drive in accordance with the present invention.
Figure 23:
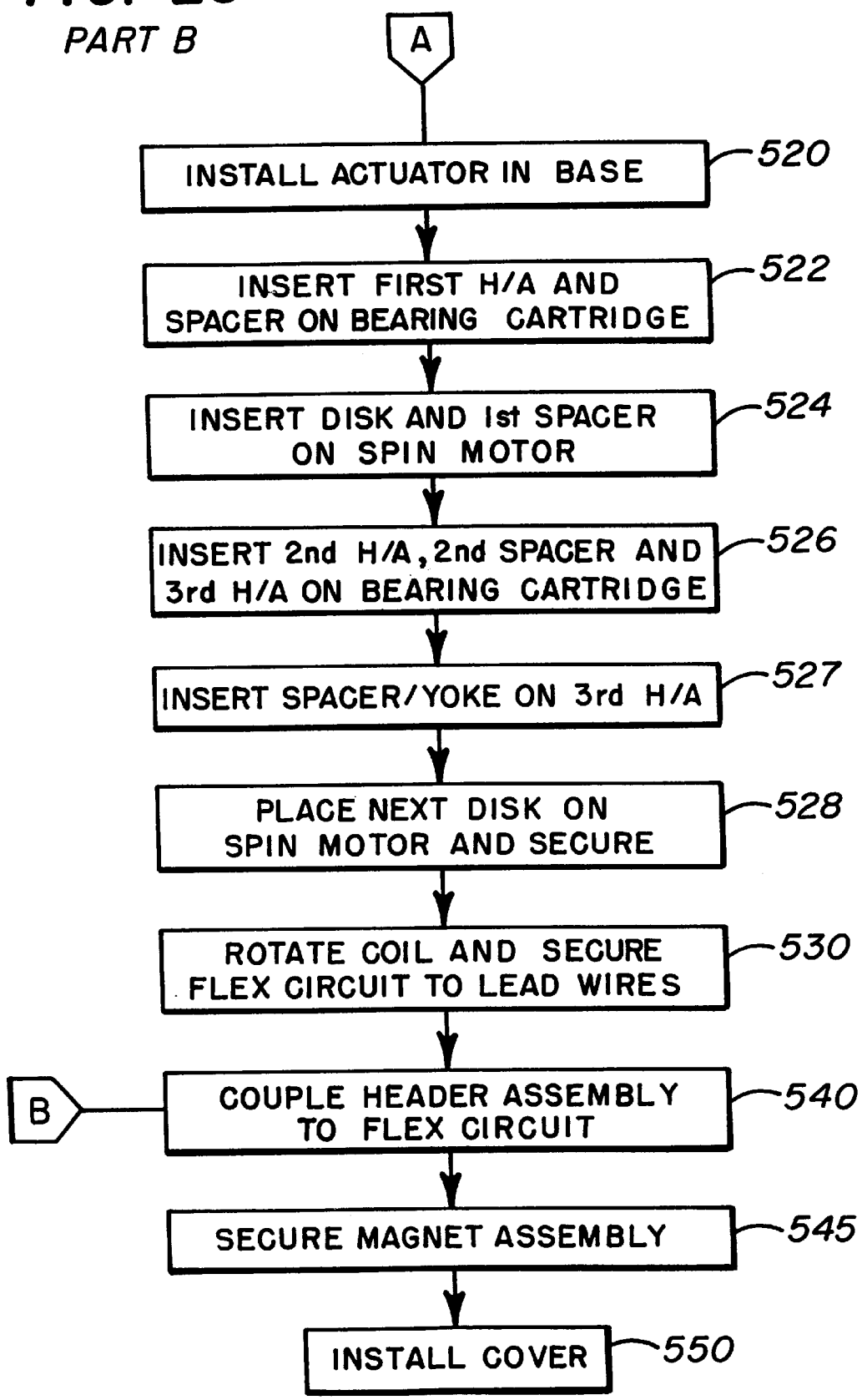

FIG. 23 is a representation of how the actuator assembly process represented in FIG. 22 with respect to apparatus 400, in accordance with the architecture of the disk drive of the present invention, may be utilized in a method for manufacturing disk drives. As shown therein, at step 501, the base plate is provided to the exact specifications of the disk drive manufacturer.

After the lower portion of the magnet assembly has been attached to base 42, the spin motor flex circuit is installed at step 504, and the spin motor secured to the base plate and spin motor flex circuit at step 506. Next, the head assembly is installed at step 508. As noted previously, the flex circuit is initially attached to spacer/yoke 86 and is not part of the header assembly installed in base 42. Thereafter, the installation process will proceed by either installing the actuator at step 518, or building the actuator directly on the base plate in accordance with steps 520–530. At steps 510–519, the method of building an actuator assembly in accordance with the apparatus shown in FIG. 22 may be performed in synchronization with the disk drive assembly process 500 so that actuator assemblies are provided to the disk drive assembly method as needed. At step 516, the assembled actuator assembly 52 may be provided to the assembly process 500, and the actuator installed at step 518.

Alternatively, at step 520, the actuator is built directly on the base plate in accordance with an alternative embodiment to the method described in accordance with apparatus 400. At step 520, the base plate is provided directly to apparatus 400 and bearing cartridge 90 secured on the base plate. It is noteworthy that the lower portion of the magnet assembly, the bottom plate and bottom magnet, were installed at step 520 on the base plate.

At step 522, head/arm assembly 56d-1 is placed over the bearing cartridge at a position where head 60d will align with the landing zone of disk 48b when the disk is placed on spin motor 50; spacer 84 is also placed on the actuator bearing cartridge at this time. At step 524, disk 60b is placed on spin motor 50, and the disk spacer placed on disk 60b. Next, at step 526, head/arm assemblies 56c-1 and 56b-1, sequentially, are placed on spacer 84, Again, the head/arm assemblies are arranged so that heads 60c, 60b will engage the landing zones on disks 48b and 48a. Spacer/yoke 68 is thereafter placed on head/arm 56b-1. At step 528, disk 46a is then placed on the disk spacer, and the disk 48a secured by the disk clamp. Finally, head/arm 56a-1 is secured on the stack, and the actuator stack coupled by clamp ring 123. At step 530, the spacer/yoke 68 is rotated and the actuator assembly fastened in accordance with the teachings presented herein. Next, the first end of flex circuit 160 is secured to the head wires by soldering or by the solderless wire coupling arrangements taught herein. At step 540, the second end of the flex circuit may be coupled to the pins of header assembly 54.

At step 545, the upper portion (the top plate and top magnet) of the magnet assembly are assembled onto the bottom portion of the assembly. Finally, at step 550 the cover and gasket are installed to ensure a controlled environment between the base and the cover.

The many features and advantages of the disk drive of the present invention, and the method for assembling the disk drive of the present invention, will be apparent to those skilled in the art from the Description of the Preferred Embodiments and the Drawings. Thus, the following claims are intended to cover all modifications and equivalents falling within the scope of the invention.

What is claimed is:

1. A storage apparatus including an electrical flex circuit, comprising:

an actuator arm securing one read/write head, the read/write head having a first electrical conductor coupled thereto;

a second electrical conductor coupled to a conductive pad of the electrical flex circuit;

a mount member having a first end and a second end, the mount member being rigid between the first end and the second end, the second end of said member including means for securing said first electrical conductor in proximity to the conductive pad of the electrical flex circuit, said first end of said member including a pin having an axis passing therethrough, the pin and axis engaging a bore in the actuator arm at said first end such that the mount member is rotatable about said axis between a first position wherein said second end is a sufficient distance from the arm such that the flex circuit may pass between the second end and the arm, and a second position wherein said first conductor is adjacent to said conductive pad.

2. The apparatus of claim 1 wherein said means for securing at the second end includes a window securing the first conductor in a fixed position over the conductive pad of the flex circuit.

3. The apparatus of claim 1 wherein the second end comprises a solderless coupling assembly electrically connected to the conductors, and wherein the conductive pad of the flex circuit is arranged to electrically couple to the solderless coupling assembly.

4. The apparatus of claim 3 wherein the solderless coupling assembly includes a conductive adhesive gel.

5. The apparatus of claim 4 wherein a corresponding conductive adhesive gel is disposed on the conductive pad of the flex circuit.

6. The apparatus of claim 3 wherein the solderless coupling assembly includes a pin assembly, and the conductive pads of the flex circuit include a socket arranged to receive the pin assembly.

7. The assembly of claim 3 wherein the solderless coupling assembly includes at least one button contact connector.

8. The apparatus of claim 1 further including a lock tab positioned between the first end and the second end, the lock tab engaging a recess in the actuator arm to secure the mount member in said second position.

9. An apparatus for automating the assembly of a disk drive, the drive including an actuator arm supporting at least one read/write head, control electronics controlling the actuator, a flexible circuit including conductive couplings coupled to the electronics, and electrical wire leads coupling the read/write head to the flexible circuit, comprising:

a carrier member, having a first end and a second end and being rigid thereinbetween, the first end including a pin formed in the carrier member and engaging a bore of the actuator arm, the carrier being secured to the actuator arm by the pin and rotatable about an axis passing through the pin and bore, the second end of the carrier member supporting the wire leads, wherein the carrier member is rotatable between a first position wherein said second end is apart from said flexible circuit and a second position wherein said second end is adjacent to the flexible circuit such that said electrical wire leads are in close association with the conductive couplings.

10. The apparatus of claim 9 wherein the wire leads are supported along the length of the actuator arm.

11. The apparatus of claim 9 wherein the carrier includes a window in the second end, the window securing the wire leads over the conductive couplings and exposing electrically conductive portions of the wire leads.

12. The apparatus of claim 9 further including solderless means for coupling the wire leads to the conductive couplings.

13. The apparatus of claim 12 wherein the solderless means comprises a conductive gel.

14. The apparatus of claim 12 wherein the solderless means comprises a button connector.

15. The apparatus of claim 12 wherein the solderless means comprises a button contact carrier.

16. The apparatus of claim 12 further including a lock tab positioned between the first end and the second end, the lock tab engaging a recess in the carrier member to secure the actuator arm in said second position.

17. A head wire carrier in a disk drive, the disk drive including an actuator having a plurality of actuator arms securing a plurality of heads with respect to a storage medium, each head having electrical conductors coupled thereto for connection to a flexible circuit, the flexible circuit being coupled to control electronics by conductive members, the carrier comprising:

- a plastic body, having a first end including a tab member having an axis passing therethrough, the tab member and axis engaging a bore in one of the plurality of actuator arms, and a second, free end, the plastic body being rigid between the first end and second end; and
- solderless means, coupled to the second free end and the electrical conductors, for electrically connecting the conductors and the flexible circuit;
- wherein the body is rotatable about the axis passing through the tab member and the bore between a first position wherein the second end is apart from the flexible circuit and a second position wherein the solderless means electrically couple the electrical conductors and conductive members.

18. A disk drive comprising:

a housing;

a storage medium supported in the housing;

a read/write head;

an actuator supporting the read/write head adjacent the storage medium;

control electronics coupled to the storage medium, the read/write head and the actuator by a flex circuit, the flex circuit having at least one solder pad;

electrical conductors coupled to the read/write head; and a rigid locator member having a first end and a second end defining a first axis, the first end including a rotation tab engaging a bore in a first portion of the actuator, the rotation tab having a second axis intersecting through the tab, the bore, and the first axis which is not parallel with the first axis, the locator member further including a lock tab and means, provided at the second end of the member, for coupling the electrical conductors to the at least one solder pad, the member being rotatable about the second axis between a first position wherein said second end is separated from the solder pad, and a second position wherein said second end is adjacent to the solder pad, said lock tab engaging the actuator to secure the locator member in said second position.

19. A disk drive comprising:

a housing;

an actuator comprised of a plurality of actuator arms and a read/write head, each head being coupled to electrical conductors;

a plurality of rigid wire carriers, each wire carrier associated with one of the arms, each wire carrier having a first end and a second end and being rigid thereinbetween, each carrier including a rotation tab having an axis passing therethrough and engaging a bore in respective ones of said plurality of actuator arms, and a lock tab, the second end securing the electrical conductors associated with each head; and a flexible circuit, having a first end including a plurality of electrical contacts, the first end being coupled between the actuator and the wire carriers, and being in electrical contact with the conductors;

wherein each of said wire carriers is rotatably coupled by the rotation tab to said associated one of said actuator arms at said first end so that each said wire carrier rotates about the rotation tab between a first position wherein the flexible circuit may come between the electrical conductors and said associated one of said actuator arms, and a second position wherein the conductors are adjacent to the electrical contacts and the respective lock tab engages the associated actuator arm.

\* \* \* \* \*